(12) United States Patent
Crews et al.

(10) Patent No.: US 7,951,857 B2
(45) Date of Patent: May 31, 2011

(54) WATER-IN-OIL BITUMEN DISPERSION AND METHODS FOR PRODUCING PAVING COMPOSITIONS FROM SAME

(75) Inventors: Everett Crews, Charleston, SC (US); Tom Girardeau, Mount Pleasant, SC (US); Iain Jack, Vale, AZ (US)

(73) Assignee: MeadWestvaco Corporation, Richmond, VA (US)

( * ) Notice: Subject to any disclaimer, the term of this patent is extended or adjusted under 35 U.S.C. 154(b) by 543 days.

(21) Appl. No.: 12/063,189

(22) PCT Filed: Mar. 26, 2007

(86) PCT No.: PCT/US2007/064897
§ 371 (c)(1),
(2), (4) Date: Feb. 7, 2008

(87) PCT Pub. No.: WO2007/112335
PCT Pub. Date: Oct. 4, 2007

(65) Prior Publication Data
US 2008/0194738 A1   Aug. 14, 2008

Related U.S. Application Data

(63) Continuation-in-part of application No. 11/391,146, filed on Mar. 28, 2006, now Pat. No. 7,297,204, which is a continuation-in-part of application No. PCT/US2005/002916, filed on Jan. 27, 2005.

(60) Provisional application No. 60/545,713, filed on Feb. 18, 2004.

(51) Int. Cl.
*C08K 3/20* (2006.01)
*C08L 95/00* (2006.01)
*E01C 7/00* (2006.01)
*E01C 11/00* (2006.01)
*E01C 5/00* (2006.01)
*E01C 5/12* (2006.01)
*B05D 5/10* (2006.01)

(52) U.S. Cl. ............... 524/60; 524/61; 404/17; 404/34; 106/277; 427/138

(58) Field of Classification Search .................. 524/60, 524/61; 404/17, 34; 106/277; 427/138
See application file for complete search history.

(56) References Cited

U.S. PATENT DOCUMENTS

| | | | |
|---|---|---|---|
| 2,508,430 A | 5/1950 | Smith et al. | |
| 3,520,709 A | 7/1970 | Mogg et al. | |
| 4,523,957 A | 6/1985 | Graf et al. | |
| 4,789,402 A | 12/1988 | Kostusyk et al. | |
| 5,085,704 A | 2/1992 | Schilling et al. | |
| 5,256,195 A | 10/1993 | Redelius | |
| 5,743,950 A | 4/1998 | Hendriks et al. | |
| 5,849,070 A | 12/1998 | Chambard et al. | |
| 6,143,812 A | 11/2000 | Martin et al. | |
| 7,297,204 B2 * | 11/2007 | Crews et al. | 106/277 |
| 2002/0058734 A1 | 5/2002 | Harlan | |
| 2002/0170464 A1 | 11/2002 | Larsen et al. | |
| 2005/0135879 A1 | 6/2005 | Grubba et al. | |
| 2006/0236614 A1 | 10/2006 | Antoine et al. | |
| 2006/0240185 A1 | 10/2006 | Antoine et al. | |
| 2007/0060676 A1 | 3/2007 | Reinke | |
| 2007/0191514 A1 | 8/2007 | Reinke | |
| 2008/0060551 A1 * | 3/2008 | Crews et al. | 106/277 |
| 2008/0069638 A1 * | 3/2008 | Crews et al. | 404/17 |

FOREIGN PATENT DOCUMENTS

| | | |
|---|---|---|
| EP | 1291391 | 11/2006 |
| EP | 1717369 | 11/2006 |
| EP | 1398351 | 6/2007 |
| JP | 60-168759 | 9/1985 |
| JP | 02-020626 | 1/2002 |
| RU | 2194062 | 7/2001 |
| WO | WO 2005 081775 | 9/2005 |
| WO | WO2006106222 | 10/2006 |
| WO | WO2007032915 | 3/2007 |

* cited by examiner

*Primary Examiner* — Mark Eashoo
*Assistant Examiner* — Angela C Scott
(74) *Attorney, Agent, or Firm* — MWV Intellectual Property Group

(57) ABSTRACT

The present invention relates to bituminous compositions suitable for use in paving applications containing water-in-oil bitumen dispersion of paving grade bitumen such as penetration-graded, viscosity-graded and/or penetration-graded varieties that is substantially free of volatile solvents and made by controlling temperature-dependent interfacial rheology through the use of selected surfactants. The invention paving compositions are suitable for use in the construction of load-bearing, high-traffic pavements at a temperature range lower than that required for conventional hot-mix bituminous paving compositions, yet with similar or superior compaction to densities property and at least equal cure rate.

145 Claims, 7 Drawing Sheets wherein,

R = saturated or unsaturated aliphatic C-12 to C-24 having linear, branched, or cyclic structure;

$x + y \geq 2$; and $a, b \geq 0$ wherein,

R = saturated or unsaturated aliphatic C-12 to C-24 having linear, branched, or cyclic structure;

$x + y \geq 2$; and $a, b \geq 0$ wherein, $R^1$, $R^2$ = saturated or unsaturated C-12 to C-24 moieties having linear, branched, or cyclic structure wherein, $R^1$, $R^2$ = saturated or unsaturated aliphatic C-12 to C-24 moieties having linear, branched, or cyclic structure; and $R^3$, $R^4$ = methyl or higher order homologs of saturated or unsaturated aliphatic C-12 to C-24 moieties having linear, branched, or cyclic structure wherein, $R^1$, $R^2$ = saturated or unsaturated aliphatic C-12 to C-24 moieties having linear, branched, and cyclic structure; and $R^3$, $R^4$ = ethoxy moieties, propoxy moieties, or combinations thereof.

WATER-IN-OIL BITUMEN DISPERSION AND METHODS FOR PRODUCING PAVING COMPOSITIONS FROM SAME

This patent application is a continuation-in-part of co-pending and commonly assigned U.S. application Ser. No. 11/391,146 filed on Mar. 28, 2006, which is a continuation-in-part application of International Patent Application No. PCT/US2005/002916 filed Jan. 27, 2005, which claims priority from U.S. Provisional Application Ser. No. 60/545,713 filed Feb. 18, 2004.

BACKGROUND OF THE INVENTION

Hot mix bituminous paving composition consists principally of aggregate and bitumen binder generally made by mixing pretreated aggregate and bitumen binder in either batch or continuous mixing equipment. Prior to mixing, the aggregate is heated to temperatures exceeding 150° C. to quantitatively remove both surface and pore-bound moisture. Bitumen is heated to temperatures typically exceeding 143° C. to lower the viscosity of the product and make it suitable for pumping through conventional liquid transfer equipment. The resulting paving composition typically has a temperature exceeding 143° C. upon exiting the mixing equipment. The high-temperature paving composition is typically referred to by those skilled in the art as hot-mix asphalt ("HMA").

Elevated temperatures are needed in the production of HMA paving composition to ensure complete aggregate drying and adequate HMA fluidity to be easily processed through the hot-mix asphalt paving plant transfer equipment such as the buggy, belt, or slat conveyors used in silo storage systems. Additionally, the HMA paving composition is produced at temperatures exceeding 143° C. to ensure that it can be discharged uniformly from haul trucks; processed easily through asphalt paver equipment; and compacted to desired densities under compressive force of conventional, static, vibratory, or oscillatory steel and pneumatic compacting equipment.

Bitumen binders commonly used in fast-, medium-, and slow-setting bituminous paving applications are oil-in-water emulsions exhibiting viscosities and flow characteristics suitable for pumping, mixing, and spraying. For oil-in-water emulsions, the bitumen or oil phase is dispersed as stabilized droplets in a continuous phase of water.

For paving compositions used in the construction of load-bearing pavements, it is not practical to use an oil-in-water bitumen emulsion containing more than 75% by weight of bitumen based on total emulsion weight. The bitumen emulsion containing such high bitumen content has unacceptable handling and transfer properties. Additionally, raising temperatures to facilitate the handling is not an option because the water phase of such oil-in-water emulsion would evaporate resulting in further increases in viscosity.

In contrast to oil-in-water bitumen emulsion, water-in-oil bitumen dispersion is characterized as dispersed water droplets in a continuous oil phase of bitumen. The interface between the polar water and non-polar bitumen phases in the water-in-oil bitumen dispersion can be stabilized by the use of surface active agents. Typically, the dispersed water phase comprises less than 20% by weight based on the weight of water-in-oil bitumen dispersion.

U.S. Pat. No. 5,256,195 discloses a bitumen binder for bituminous paving composition consisting of a conventional bitumen emulsion of anionic or cationic type and a breaking additive comprising water-in-oil bitumen dispersion. The breaking additive is mixed into the conventional emulsion shortly before the use of the bitumen to control the breaking of bitumen emulsion in such a way that it is delayed but rapid once it has started. After a short delay time which is defined by the amount and composition of the additive, the bitumen emulsion breaks and develops rapidly a good ability to bind to stone material. The amount of breaking additive is generally about 1-15%, preferably 2-4%, by weight based on the weight of the finished bitumen emulsion. Water-in-oil dispersion used in the breaking additive comprises chiefly low-viscosity oils such as mineral oils and the like and/or low-viscosity bitumen such as bitumen flux. As a result, use of such water-in-oil dispersion breaking additive in paving composition reduces the early compressive strength of compacted pavement. Dosages of cutter stocks, as little as 0.1% by weight of the emulsion, often decrease the compacted pavement compressive strength until such time as the cutter stock has evaporated into the atmosphere. Decreased compressive strength may result in deformation under traffic; therefore, the emulsions containing such water-in-oil dispersion breaking additive are not suitable for use in the paving compositions for the construction of load-bearing pavements.

The bituminous paving compositions containing water-in-oil dispersion of paving grade bitumen (either performance-graded bitumens specified by the Strategic Highway Research Program, viscosity-graded bitumens, or penetration graded bitumens) exhibit viscosity that prevents flow at temperatures below the boiling point of water. Poor handling and transfer properties of such high viscosity dispersion prevent its use in the production of bituminous compositions for construction of load-bearing pavements utilizing conventional hot-mix asphalt production and construction equipment. Plant engineering controls and liquid transfer equipment are not compatible with use of such high-viscosity compositions. Water-in-oil bitumen dispersions made with conventional paving grade bitumen must be produced in a pressure vessel to prohibit an evaporation of water. Typically, paving grade bitumen must be heated to about 135° C. to ensure its sufficient fluidity for a proper processing in conventional colloid mill equipment. Combination of 80 parts bitumen at 135° C. with 20 parts water results in a water-in-oil bitumen dispersion having a temperature exceeding 135° C. Without backpressure, boiling of the water occurs.

To address the processing difficulty due to high viscosity, paving grade bitumen is typically pre-diluted with bitumen-compatible solvents such as diesel, naphtha, gasoline, kerosene, biodiesel, waste oils, and other suitable bitumen-compatible diluents. Pre-dilution of the bitumen reduces the required temperature of the bitumen phase during the production of water-in-oil dispersion, as well as prevents a potential boil out of the finished product. However, use of bitumen-compatible solvents or other diluents has undesirable consequences. Fugitive vapors in the solvent/diluent pose health hazards for worker and concerns for air pollutants due to the volatile emission. The solvent/diluent may leach into soils and groundwater supplies, deteriorating water and soil quality. Moreover, the solvent/diluent residue may remain in the bitumen of the finished pavement structure, causing a significant reduction in stiffness of the pavement. Reduction in stiffness, in turn, leads to deformation in the pavement structure under a load of traffic. Thus, application of such paving composition containing residue solvent/diluent is primarily limited to highways for rural and/or low traffic volume routes.

Hot mix bituminous paving compositions made of paving grade bitumen and designed for high-traffic load-bearing pavements, are normally produced by mixing the liquefied non-emulsified bitumen with preheated aggregate at elevated temperatures usually in excess of 150° C. Prior to mixing, the non-emulsified bitumen is liquefied by heating to temperatures far in excess of its melting point, and the aggregate is preheated in a rotating kiln at extremely high temperatures to drive off all water adsorbed within thereof. The finished hot mix paving composition containing aggregate and bitumen binder must be substantially free of water to ensure that the paving composition shows no moisture sensitivity once it is transported, laid down and compacted. Furthermore, the hot mix paving compositions must be produced, laid down, and compacted at the temperature in excess of 150° C., since its compactability depends on the temperature. The handling, placement and compaction of composition become extremely difficult and the design densities (air voids) cannot be achieved, if a temperature of the hot mix paving composition is below 100° C. Failure to reach the design densities results in deformation or rutting of the pavement layer in the wheel paths of vehicular traffic. Additionally, failure to reach design density may yield an overly porous pavement susceptible to moisture intrusion and moisture-related distress.

Therefore, in the construction of load-bearing pavements there is a need for a bituminous paving composition made of paving grade bitumen (either performance-graded bitumens specified by the Strategic Highway Research Program, viscosity-graded bitumens, or penetration graded bitumens) that can be produced using conventional production equipment, as well as easily processed and transferred.

Furthermore, in the construction of load-bearing pavements there is a need for a bituminous paving composition made of paving grade bitumen that is substantially free of volatile solvent/diluent to minimize, if not completely eliminate, an emission of volatile compounds and/or the amount volatile compound residues left in the finished pavement.

Additionally, in the construction of load-bearing pavements there is a need for bituminous paving composition that can be produced, transferred and applied at a lower temperature range than the typically high temperature required for hot-mix paving composition.

It is an object of the present invention to provide novel water-in-oil bitumen dispersions suitable for use in load-bearing pavements.

It is another object of the invention to provide bituminous paving compositions for load-bearing pavements containing water-in-oil bitumen dispersions of paving grade bitumen such as penetration-graded, viscosity-graded and/or penetration-graded varieties that have controllable and temperature-dependent interfacial rheology.

It is yet another object of the present invention to provide bituminous paving compositions for load-bearing pavements containing water-in-oil bitumen dispersions of paving grade bitumen such as penetration-graded, viscosity-graded and/or penetration-graded varieties that is substantially free of volatile solvents.

It is a further object of the invention to provide bituminous paving compositions for load-bearing pavements containing water-in-oil bitumen dispersions of paving grade bitumen, i.e. penetration-graded, viscosity-graded and/or penetration-graded varieties that can be produced using conventional production equipment such as in-line mixing methods involving static and/or dynamic mechanical unit operations in fixed and/or mobile asphalt mix plants of the batch, continuous, and/or dual varieties. The term "mobile" includes, but is not limited to, equipments used in-situ and in-place operations.

It is still a further object of the present invention is to provide bituminous paving compositions that exhibit substantially complete aggregate coating and compactability to required densities in the field, as well as rapidly develops load-bearing strength.

Other objects, features and advantages of the present invention will be set forth in part in the description which follows, and in part will be obvious from the description or may be learned by practice of the invention.

SUMMARY OF THE INVENTION

The present invention relates to bituminous compositions suitable for use in paving applications containing water-in-oil bitumen dispersion of paving grade bitumen such as penetration-graded, viscosity-graded and/or penetration-graded varieties that is substantially free of volatile solvents, made by controlling temperature-dependent interfacial rheology through the use of selected surfactants. The water-in-oil bitumen dispersions of the invention paving compositions contain surfactants having structural attributes that impart low interfacial viscosity, low Marangoni effect, and high interfacial bitumen solubility at a temperature range of about 60° C. to about 120° C., to improve interfacial stability and rheology of the dispersions. The invention paving compositions have improved control of interfacial stability and rheology at a higher temperature than that of ambient cold mix technologies, but a lower temperature than that of hot mix technologies; thereby providing improved densification and accelerated strength development in the compacted state when used for load-bearing road pavement.

The invention water-in-oil bitumen dispersions made of paving grade bitumen, i.e. performance-graded bitumen, viscosity-graded bitumen and penetration-graded bitumen commonly used in production of load-bearing and/or high-traffic pavements, is substantially solvent free (i.e., less than 4% solvent) and exhibit controllable, temperature-dependent interfacial rheology and fully coat aggregate at a temperatures range of about 60° C. to about 120° C. Consequently, the invention bituminous paving compositions are suitable for the construction of load-bearing pavements with improved compaction to densities similar or superior to those achieved in the conventional hot mix bituminous paving compositions. Cure rate of the invention bituminous compositions is higher than those of cold mix bitumen emulsion-based paving compositions, and at least equal to those of hot mix bituminous paving compositions. Additionally, the invention bituminous compositions used in pavement construction at a temperatures range of about 60° C. to about 120° C. develop adhesive strength and load-bearing strength properties at rates comparable to those of hot mix bituminous paving compositions, and at rates faster than those of cold mix bituminous paving compositions.

DETAILED DESCRIPTION OF THE INVENTION

Figure 1:
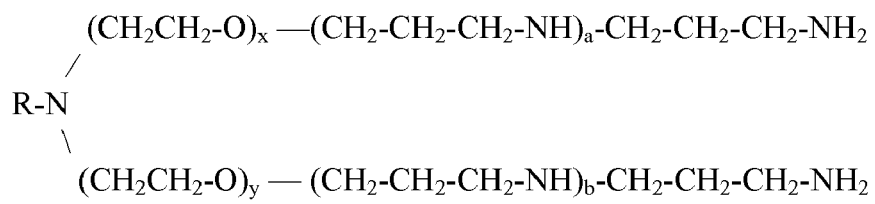
FIG. 1 is a schematic illustration of ethoxytrimethyleneamine derivatives of C-12 to C-24 fatty amine surfactant of structure (I)

The present inventions now will be described more fully hereinafter, but not all embodiments of the invention are shown. Indeed, these inventions may be embodied in many different forms and should not be construed as limited to the embodiments set forth herein; rather, these embodiments are provided so that this disclosure will satisfy applicable legal requirements.

The terms "bitumen" or "bituminous" in the present invention refer to naturally-occurring bitumen and modified bitumen. They are also known as "asphalt."

The bituminous compositions of the present invention suitable as paving compositions for load-bearing pavement and/or high traffic pavements comprise water-in-oil bitumen dispersion and aggregate. It is to be understood that the "aggregate" in the present invention also includes reclaimed asphalt pavement (RAP). The water-in-oil bitumen dispersion is solvent-free and contains bitumen, water, and a surfactant or combination of surfactants having structural attributes that impart low interfacial viscosity, low Marangoni effect, and high interfacial bitumen solubility at a temperature range of about 60° C. to about 120° C. to improve interfacial stability and rheology of the dispersions.

Any known bitumen met specifications of performance grade, viscosity grade, or penetration graded may be used in the present invention. Suitable aggregates for use in the present invention have properties met specifications established by the appropriate transportation authorities as suitable for use in construction of load-bearing pavements.

In one embodiment of the present invention, the bituminous paving composition comprises:
(i) water-in-oil bitumen dispersion in an amount of from about 2% to about 10% by total weight of the bituminous composition, wherein the water-in-oil dispersion comprises:
  (a) bitumen in an amount of from about 75% to about 95% by total weight of the dispersion,
  (b) surfactant package having an interfacial tension between the bitumen and water of less than 40 dynes/cm at a temperature of 26° C. and at an aqueous concentration of less than 0.1% weight, in an amount from about 0.05% to about 2% by total weight of the dispersion,
  (c) water in an amount to complete the dispersion; and
(ii) aggregate and/or reclaimed asphalt pavement in an amount of from about 90% to about 98% by total weight of the bituminous composition.

In one embodiment of the present invention, the bituminous paving composition comprises:
(i) water-in-oil bitumen dispersion in an amount of from about 2% to about 10% by total weight of the bituminous composition, wherein the water-in-oil dispersion comprises:
  (a) bitumen in an amount of from about 85% to about 95% by total weight of the dispersion,
  (b) surfactant package having an interfacial tension between the bitumen and water of less than 40 dynes/cm at a temperature of 26° C. and at an aqueous concentration of less than 0.1% weight, in an amount from about 0.05% to about 2% by total weight of the dispersion,
  (c) water in an amount to complete the dispersion; and
(ii) aggregate and/or reclaimed asphalt pavement from about 90% to about 98% by total weight of the bituminous composition.

In one embodiment of the present invention, the bituminous paving composition comprises:
(i) water-in-oil bitumen dispersion in an amount of from about 2% to about 10% by total weight of the bituminous composition, wherein the water-in-oil dispersion comprises:
  (a) bitumen in an amount of from about 75% to about 95% by total weight of the dispersion,
  (b) surfactant package having an interfacial tension between the bitumen and water of less than 40 dynes/cm at a temperature of 26° C. and at an aqueous concentration of less than 0.1% weight, in an amount from about 0.08% to about 0.5% by total weight of the dispersion,
  (c) water in an amount to complete the dispersion; and
(iii) aggregate and/or reclaimed asphalt pavement from about 90% to about 98% by total weight of the bituminous composition.

In one embodiment of the present invention, the bituminous paving composition comprises:
(i) water-in-oil bitumen dispersion in an amount of from about 2% to about 10% by total weight of the bituminous composition, wherein the water-in-oil dispersion comprises:
  (a) bitumen in an amount of from about 75% to about 95% by total weight of the dispersion,
  (b) surfactant package having an interfacial tension between the bitumen and water of less than 40 dynes/cm at a temperature of 26° C. and at an aqueous concentration of less than 0.1% weight, in an amount from about 0.1% to about 0.75% by total weight of the dispersion, and
  (c) water in an amount to complete the dispersion; and
(ii) aggregate and/or reclaimed asphalt pavement from about 90% to about 98% by total weight of the bituminous Bitumen Suitable bitumens for use in the present invention may be bitumen, modified bitumen, and combinations thereof. As used herein, the "bitumen" and "modified bitumen" are those which exhibit rheological properties that are appropriate for paving applications under specific climatic conditions, such as those which conform to the Strategic Highway Research Program (SHRP) pavement binder specifications. Furthermore, the bitumens may conform to specifications of viscosity-graded and/or penetration-graded bitumens.

Suitable bitumens for use in the present invention include, but are not limited to, naturally occurring bitumens such as lake asphalt, gilsonite and gilsonite derivatives; bitumens derived from crude oil; petroleum pitches obtained from a cracking process; coal tar; and combinations thereof. Additionally, bitumens suitable for use in the present invention may contain recycled crumb rubber from recycled tires. It is to be understood that bitumen or bituminous may also be known as asphalt.

Suitable modified bitumens for the present invention may comprise any additives known in the production of modified bitumen having properties met the performance-grade standards. These additives may include, but are not limited to, natural rubbers, synthetic rubbers, plastomers, thermoplastic resins, thermosetting resins, elastomers, and combinations thereof. Examples of these additives include, but are not limited to, styrene-butadiene-styrene (SBS), styrene-butadiene-rubber (SBR), polyisoprene, polybutylene, butadiene-styrene rubber, vinyl polymer, ethylene vinyl acetate, ethylene vinyl acetate derivative and the like.

In one embodiment of the present invention, the modified bitumen comprises at least one additive selected from the group consisting of styrene-butadiene-styrene; styrene-butadiene-rubber; sulfur-containing crosslinker; acid modifier such as tall oil acid, tall oil pitch and phosphoric acid derivative; and combinations thereof. It is well within the ability of a skilled artisan to produce modified bitumen containing the noted additives.

Where desired, the modified bitumen may comprise additional additives traditionally employed in the production of bitumen emulsions to adjust the characteristics of the finished bituminous paving compositions. Such additional additives include, but are not limited to, styrene-butadiene-rubber latex; polyisoprene latex; salt; acid modifier such as polyphosphoric acid, crude tall oil, distilled tall oil acids, tall oil pitch and derivative thereof; wax modifier such as Montan wax, beeswax and Fisher-Tropsch waxes; and combinations thereof.

Surfactant

Surfactants used in the present invention may anionic types, amphoteric types, cationic types, nonionic types, and combinations thereof.

Suitable anionic surfactants include, but are not limited to, the following: saturated C-12 to C-24 fatty acid; unsaturated C-12 to C-24 fatty acid; unsaturated C-12 to C-24 fatty acid modified with acrylic acid, maleic anhydride, fumaric acid, diene, or dieneophile; rosin acid; rosin acid modified with acrylic acid, maleic anhydride, fumaric acid, diene or dieneophile; natural resinous polymer; Vinsol resin; quebracho resin; tannin; lignous polymer such as tall oil lignin and the like; polyacrylic acid; polyacrylate derivative; alkyl sulfonate; alkyl benzyl sulfonate; alkyl sulfate; alkyl phosphonate; alkyl phosphate; phenolic resin; and combinations thereof.

As used herein, the term "anionic surfactants" includes the above-noted compounds and their derivatives. These include, but are not limited to, complex, addition product, and condensation product formed by a reaction of (i) at least one member selected from the group consisting of natural resinous polymer, Vinsol resin, quebracho resin, tannins and lignin; and (ii) at least one member selected from the group consisting of saturated C10-C24 fatty acid, unsaturated C10-C24 fatty acid, and unsaturated C10-C24 fatty acid modified with at least one member selected from the group consisting of acrylic acid, maleic anhydride, fumaric acid, dienes and dienophile.

Sulfate, sulfonate, phosphate, or phosphonate derivatives of the aforementioned compounds are suitable for use in the present invention including, but are not limited to, those of lignin, natural resinous polymer, Vinsol resin, quebracho resin, and tannin. Sulfate, sulfonate, phosphate, or phosphonate derivatives of the complex, addition product, or condensation product formed by a reaction of (i) at least one member selected from the group consisting of natural resinous polymer, Vinsol resin, quebracho resin, tannins and lignin; and (ii) at least one member selected from the group consisting of saturated C10-C24 fatty acid, unsaturated C10-C24 fatty acid, and unsaturated C10-C24 fatty acid modified with at least one member selected from the group consisting of acrylic acid, maleic anhydride, fumaric acid, diene and dienophile may also be used in the present invention.

As used herein the term "amphoteric surfactants" includes both mono-amphoteric and polyamphoteric surfactants. Amphoteric surfactants suitable for use in the present invention may be products obtained by (i) modifying C-12 to C-24 fatty acids with at least one member selected from the group consisting of acrylic acid, maleic anhydride, fumaric acid, diene and dieneophile; and then (ii) reacting the resulting modified products with at least one member selected from the group consisting of polyethylene polyamine, lithium C-12 to C-24 alkyl amidopropyl halide methyl carboxylate betaine, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines.

Cationic surfactants suitable for use in the present invention may include, but are not limited to, the following: fatty imidoamines derived from (i) modifying C-12 to C-24 fatty acids with at least one member selected from the group consisting of acrylic acid, maleic anhydride, fumaric acid, diene and dieneophile, and then (ii) reacting the resulting modified products with polyalkylenepolyamines; fatty amidoamines derived from (i) modifying C-12 to C-24 fatty acids with at least one member selected from the group consisting of acrylic acid, maleic anhydride, fumaric acid, diene and dieneophile, and then (ii) reacting the resulting modified products with at least one member selected from the group consisting of polyalkylenepolyamines, saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines; polyoxyethylene derivatives made by modifying saturated C-12 to C-24 alkyl monoamines with at least one member selected from the group consisting of ethylene oxide and propylene oxide; polyoxyethylene derivatives made by modifying unsaturated C-12 to C-24 alkyl monoamines with at least one member selected from the group consisting of ethylene oxide and propylene oxide; polyoxyethylene derivatives made by modifying saturated C-12 to C-24 alkyl polypropylenepolyamines with at least one member selected from the group consisting of ethylene oxide and propylene oxide; polyoxyethylene derivatives made by modifying unsaturated C-12 to C-24 alkyl polypropylenepolyamines with at least one member selected from the group consisting of ethylene oxide and propylene oxide; saturated C-12 to C-24 alkyl aryl monoamines; unsaturated C-12 to C-24 alkyl aryl monoamines; saturated C-12 to C-24 alkyl aryl polypropylenepolyamines; unsaturated C-12 to C-24 alkyl aryl polypropylenepolyamines; saturated C-12 to C-24 quaternary amines; unsaturated C-12 to C-24 quaternary amines; amine derivatives of tannins; amine derivatives of phenolic resins; amine derivatives of lignins; amine-modified polyacrylates; and combinations thereof.

In one embodiment of the present invention, the cationic emulsifier may comprise a member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof.

In one embodiment of the present invention, the cationic emulsifier may be a blend of at least one member selected from the group consisting of saturated and unsaturated C-12 to C-24 alkyl monoamines, and at least one member selected from the group consisting of saturated and unsaturated C-12 to C-24 alkyl polypropylenepolyamines.

As used herein, the term "cationic surfactants" includes the above-noted compounds and their derivatives.

Nonionic surfactants which are suitable for use in the present invention include, but are not limited to, the following: alkylaryl polyethylene oxide and polypropylene oxide derivatives; polyethylene oxide derivatives of branched, linear, and cyclic alkanols, sorbitan esters, mono- and polysaccharide derivatives; polypropylene oxide derivatives of branched alkanols, linear alkanols, cyclic alkanols, sorbitan esters, monosaccharide derivatives and polysaccharide derivatives; protein stabilizers such as casein and albumin; polyethoxylated derivatives of the anionic, amphoteric, and cationic surfactants mentioned above; polypropoxylated derivatives of the anionic, amphoteric, and cationic surfactants mentioned above; and mechanical stabilizers such as the phyllosilicate bentonite and montmorillonite clays.

In one embodiment of the present invention, the surfactant may be nonionic surfactants including, but are not limited to, alkyl polysaccharides; alkylphenol alkoxylates such as alkylphenol ethoxylates, alkylphenol propoxylates, dialkylphenol ethoxylates, and dialkylphenol propoxylates; fatty alcohol ethoxylates such as saturated or unsaturated fatty acid ethoxylate having linear, branched, or cyclic structure; saturated or unsaturated fatty acid propoxylate having linear, branched, or cyclic structure; ethoxylates of escinoleic acid or castor oil; and propoxylates of escinoleic acid or castor oil.

In one embodiment of the present invention, the surfactant may comprise a nonionic surfactants including, but are not limited to, polyethylene-polypropylene block copolymers; hydroxypoly(oxyethylene)poly(oxypropylene)poly(oxyethylene) block copolymers; 1,2-propyleneglycol ethoxylated and propoxylated; and synthetic block copolymers of ethylene oxide and propylene oxide having molecular weights exceeding 300 g/mole.

In one embodiment of the present invention, the surfactant may be non-tallow or non-tall oil based surfactant including, but are not limited to, decyl alcohol ethoxylates; castor oil ethoxylate; ceto-oleyl alcohol ethoxylate; ethoxylated alkanolamide; fatty alcohol alkoxylates; dinonyl phenol ethoxylate; nonyl phenol ethoxylate; sorbitan ester ethoxylate; alkyl ether sulphate; monoalkyl sulphosuccinamate; alkyl phenol ether sulphate; fatty alcohol sulphate; di-alkyl sulphosuccinate; alkyl ether phosphate; alkyl phenol ether phosphate; alkyl naphthalene sulphonate; α-olefin sulphonate; alkyl benzene sulphonic acids and salt; alkyl ampho(di) acetate; alkyl betaine; alkyl polysaccharide; alkylamine ethoxylate; amine oxide; combinations thereof.

Oligomers, co-oligomers, ter-oligomers, tetra-oligomers, polymers, copolymers, terpolymers, or tetrapolymers of acrylic acid, alkylacrylic acid, or alkyl esters of acrylic acid, alkyl esters of alkylacrylic acid, hydroxyalkyl esters of acrylic acid, hydroxyalkyl esters of alkylacrylic acids, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkenes, dienes, allyl alcohol, polyhyrdoxylated polyalkenes, halogenated ethylene, halogenated propylene, and/or halogenated alkylidenes are suitable for use as surfactants in the present invention. Furthermore, the lithium, sodium, potassium, magnesium, calcium, ammonium, or alkylammonium salts of the aforementioned polymers may be used as surfactants in the present invention. Examples of suitable dienes for use in the present invention include, but are not limited to, butadiene, cyclopentadiene, and isoprene.

In one embodiment of the present invention, the surfactant may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of oligomers, co-oligomers, ter-oligomers, tetra-oligomers, homopolymers, copolymers, terpolymers, and tetrapolymers of acrylic acid, alkylacrylic acid, alkyl esters of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethane, propene, higher order alkene, diene, hydroxylated propene, polyhyrdoxylated polyalkenes, halogenated ethylene, halogenated propylene, and/or halogenated alkylidene. Examples of suitable dienes for use in the present invention include, but are not limited to, butadiene, cyclopentadiene, and isoprene.

In one embodiment of the present invention, the surfactant may comprise a member selected from the group consisting of oligomeric ethyleneamines, oligomeric polypropyleneamines, hexamethylene diamine, bis-hexamethylene diamine, oligomeric aziridine, polyaziridine, polyethylene polyamines, polypropylene polyamines, polyethylene/polypropylene polyamines, and higher order polyalkylene polyamines such as the distillation residues from polyalkylene polyamine manufacture.

In one embodiment of the present invention, the surfactant may be salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of oligomeric ethyleneamines, oligomeric polypropyleneamines, hexamethylene diamine, bis-hexamethylene diamine, oligomeric aziridine, polyaziridine, polyethylene polyamines, polypropylene polyamines, polyethylene/polypropylene polyamines, and higher order polyalkylene polyamines such as the distillation residues from polyalkylene polyamine manufacture.

In one embodiment of the present invention, the surfactant may comprise monoethoxylated, polyethoxylated, monopropylated, or polypropylated condensates of oligomeric ethyleneamines, oligomeric polypropyleneamines, hexamethylene diamine, bis-hexamethylene diamine, polyethylene polyamines, polypropylene polyamines, and/or higher order polyalkylene polyamines such as the distillation residues from polyalkylene polyamine manufacture.

In one embodiment of the present invention, the surfactant may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of monoethoxylated, polyethoxylated, monopropylated, and polycondensates of oligomeric ethyleneamines, oligomeric polypropyleneamines, hexamethylene diamine, bis-hexamethylene diamine, polyethylene polyamines, polypropylene polyamines, and/or higher order polyalkylene polyamines such as the distillation residues from polyalkylene polyamine manufacture.

In one embodiment of the present invention, the surfactant may comprise hydroxyalkyl amine such as hydroxyethyl amine, hydroxyethyl polyamine, hydroxypropyl polyethylene amine, hydroxypropyl amine, hydroxypropyl polypropylene amine, and combinations thereof.

In one embodiment of the present invention, the surfactant may comprise salt obtained by the reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) hydroxyalkyl amine such as hydroxyethyl amine, hydroxyethylpolyamine, hydroxypropyl polyethylene amine, hydroxypropyl amine, hydroxypropyl polypropylene amine, and combinations thereof.

In one embodiment of the present invention, the surfactant may comprise C-36 dimeric fatty acids or C-54 trimeric fatty acids. In one embodiment of the present invention, the surfactant may comprise polymeric condensation products formed by a reaction of C-36 dimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of polymeric condensation products formed by a reaction of C-36 dimeric fatty acid with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the surfactant may comprise polymeric condensation products formed by a reaction of C-54 trimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) polymeric condensation product formed by a reaction of C-54 trimeric fatty acids with at least one member selected from the group consisting of oligomeric ethyleneamines, polyethylene polyamines, oligomeric propylamines, polypropylene polyamines, and higher order polyalkylene polyamines such as the distillation residues from polyalkylene polyamine manufacture.

In one embodiment of the present invention, the surfactant may comprise a member selected from the group consisting of hydroxystearic acid, oligomer of hydroxystearic acid, and polymeric hydroxystearic acid.

In one embodiment of the present invention, the surfactant may comprise a member selected from the group consisting of polymeric condensation products formed by a reaction of (i) at least one member selected from the group consisting of ethylene amines, propylene amines, ethylene/propylene amines, oligomeric ethyleneamines, polyethylene polyamines, oligomeric propylene amine and higher order polyalkylene polyamines such as the distillation residues from polyalkylene polyamine manufacture; and (ii) at least one member selected from the group consisting of hydroxystearic acid, oligomers of hydroxystearic acid, and polymeric hydroxystearic acid.

In one embodiment of the present invention, the surfactant may comprise polymeric condensation products formed by a reaction of Lewis acid base such as lithium hydroxide, sodium hydroxide, and potassium hydroxide; and at least one member selected from the group consisting of hydroxystearic acid, oligomers of hydroxystearic acid, and polymeric hydroxystearic acid.

In one embodiment of the present invention, the surfactant may comprise ethoxytrimethyleneamine derivatives of C-12 to C-24 fatty amines of structure (I), as shown in FIG. 1 wherein R is aliphatic C-12 to C-24 moieties; the sum of x and y is greater or equal to two; and a and b are greater than or equal to zero. The aliphatic C-12 to C-24 moieties may be saturated or unsaturated having linear, branched, or cyclic structure.

In one embodiment of the present invention, the surfactant may comprise a member selected from the group consisting of salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of ethoxytrimethyleneamine derivative of C-12 to C-24 fatty amines of structure (I).

Figure 2:
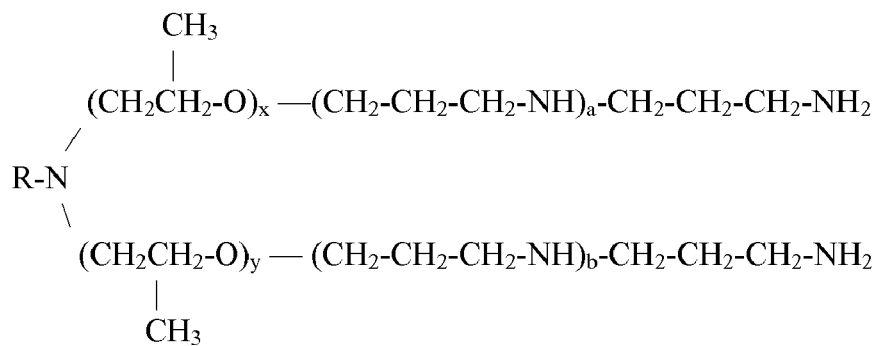
FIG. 2 is a schematic illustration of propoxytrimethyleneamine derivatives of C-12 to C-24 fatty amine surfactant of structure (II)

In one embodiment of the present invention, the surfactant may comprise propoxytrimethyleneamine derivatives of C-12 to C-24 fatty amines of structure (II), as shown in FIG. 2 wherein R is aliphatic C-12 to C-24 moieties; the sum of x and y is greater or equal to two; and a and b are greater than or equal to zero. The aliphatic C-12 to C-24 moieties may be saturated or unsaturated having linear, branched, or cyclic structure.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of propoxytrimethyleneamine derivative of C-12 to C-24 fatty amines of structure (II).

Figure 3:
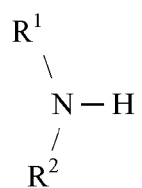
FIG. 3 is a schematic illustration of aliphatic C-12 to C-24 dialkyl amine surfactant of structure (III)

In one embodiment of the present invention, the surfactant may comprise a member selected from the group consisting of saturated aliphatic C-12 to C-24 dialkyl amines having linear, branched, or cyclic structure; and unsaturated aliphatic C-12 to C-24 dialkyl amines having linear, branched, or cyclic structure of structure (III), as shown in FIG. 3 wherein $R^1$ and $R^2$ may be the same or different; and each may be saturated or unsaturated aliphatic C-12 to C-24 moieties having linear, branched, or cyclic structure.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of saturated and unsaturated aliphatic C-12 to C-24 dialkyl amines of structure (III).

Figure 4:
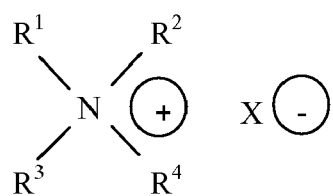
FIG. 4 is a schematic illustration of aliphatic C-12 to C-24 quaternary amine surfactant of structure (IV)

In one embodiment of the present invention, the surfactant may comprise quaternary amine derivative of at least one member selected from the group consisting of linear, branched, or cyclic saturated aliphatic C-12 to C-24 alkyl amines; and linear, branched, or cyclic saturated aliphatic C-12 to C-24 alkyl amines of structure (IV), as shown in FIG. 4 wherein $R^1$ and $R^2$ may be the same or different saturated and unsaturated linear, branched, and cyclic aliphatic C-12 to C-24 moieties, and $R^3$ and $R^4$ may be methyl moieties or other higher order homologs of saturated or unsaturated linear, branched, and cyclic aliphatic moieties.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of quaternary amine derivative of saturated or unsaturated aliphatic C-12 to C-24 alkyl amines of structure (IV).

Figure 5:
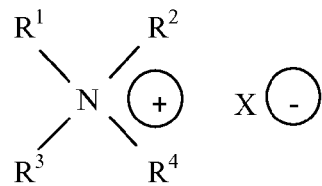
FIG. 5 is a schematic illustration of aliphatic C-12 to C-24 quaternary amine surfactant of structure (V)

In one embodiment of the present invention, the surfactant may comprise quaternary amine derivative of at least one member selected from the group consisting of linear, branched, or cyclic saturated aliphatic C-12 to C-24 alkyl amine; and linear, branched, or cyclic saturated aliphatic C-12 to C-24 alkyl amine of structure (V), as shown in FIG. 5 wherein $R^1$ and $R^2$ may be the same or different linear, branched, and cyclic saturated or unsaturated aliphatic C-12 to C-24 moieties; and $R^3$ and $R^4$ are ethoxy or propoxy moieties and combinations thereof.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) at least one member selected from the group consisting of quaternary amine derivative of saturated or unsaturated aliphatic C-12 to C-24 alkyl amines of structure (V).

In one embodiment of the present invention, the surfactant may comprise bisamide formed by a reaction of polyalkylenepolyamines and adduct obtained by modifying at least one member selected from the group consisting of linear, branched, or cyclic saturated aliphatic C-12 to C-24 fatty acid; and linear, branched, or cyclic saturated aliphatic C-12 to C-24 fatty acids with at least one member selected from the group consisting of acrylic acid, maleic anhydride, fumaric acid, diene and dieneophile.

In one embodiment of the present invention, the surfactant may comprise salt obtained by a reaction of (i) at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid; and (ii) bisamide formed by a reaction of polyalkylenepolyamines and adduct obtained by modifying at least one member selected from the group consisting of linear, branched, or cyclic saturated aliphatic C-12 to C-24 fatty acid; and linear, branched, or cyclic saturated aliphatic C-12 to C-24 fatty acids with at least one member selected from the group consisting of acrylic acid, maleic anhydride, fumaric acid, diene and dieneophile.

In one embodiment of the present invention, the surfactant may comprise dialkylarylamine. In one embodiment of the present invention, the surfactant may comprise salt obtained by a reaction of dialkylarylamine and at least one member selected from the group consisting of hydrogen halides such as hydrochloric acid; carboxylic acids such as acetic acid, propionic acid, butyric acid, oxalic acid, maleic acid, fumaric acid, and citric acid; and phosphoric acid.

Suitable surfactants for use in the present invention have high-temperature shear-stability needed for mixing and subsequent compacting of the bituminous compositions, as interfacial tension between the bitumen film and aggregate so that a strong adhesive bond is maintained and water damage to the pavement is prevented.

Surfactant formulations are chosen to control dispersion properties such as interfacial viscosity, Marangoni effect, and interfacial bitumen solubility at the elevated temperature of the present invention (i.e., about 50° C. to about 120° C.) and concurrently at low surfactant dosages. Surfactant dosages likewise are chosen to impart the target interfacial properties in the finished emulsion. High surfactant dosages are avoided because they are costly. Furthermore, high surfactant dosages contribute to low rates of compressive strength development, and increase moisture sensitivity in the finished pavement.

In one embodiment, the surfactant used in the water-in-oil dispersion has interfacial tension between bitumen and water of less than 40 dynes/cm at 26° C. and at an aqueous concentration of less than 0.1% weight.

In one embodiment, the surfactant has an interfacial tension between bitumen and water of less than 30 dynes/cm at 26° C. and at an aqueous concentration of less than 0.1% weight.

In one embodiment, the surfactant has an interfacial tension between bitumen and water of less than 20 dynes/cm at 26° C. and at an aqueous concentration of less than 0.1% weight.

In one embodiment, the surfactant has an interfacial tension between bitumen and water of less than 10 dynes/cm at 26° C. and at an aqueous concentration of less than 0.1% weight.

In one embodiment, the surfactant has an interfacial tension between bitumen and water of less than 5 dynes/cm at 26° C. and at an aqueous concentration of less than 0.1% weight.

The water-in-oil bitumen dispersion of the present invention may be solvent-free. Environmental concerns have driven the reduction, up to elimination, of organic solvents from paving bitumen emulsions. However, for technological reasons total elimination has not been available in all paving applications prior to the availability of the present invention. In certain districts the term "solvent-free" is defined to include a minor portion of organic solvents. For example, "solvent-free" has at one time been defined in the state of Pennsylvania to include up to 4% organic solvents. For the purposes of this invention, therefore, where desired the water-in-bitumen dispersion may contain at least one solvent (such as naphtha, kerosene, diesel, flux, and the like) at a level less than that needed to facilitate either: 1) the mixing of the bituminous composition at ambient temperature to yield fully-coated aggregate, or 2) the compaction of the bituminous composition at ambient temperatures. In one embodiment, the level of solvent in the invention water-in-oil bitumen dispersion is less than about 1% by total weight of the dispersion. As used herein, the term "ambient temperatures" means an environmental temperature of less than about 40° C.

Aggregate

Aggregate used in paving materials and road construction, road rehabilitation, road repair and road maintenance are derived from natural and synthetic sources. It is to be understood that the "aggregate" in the present invention also includes reclaimed asphalt pavement (RAP). As in any construction process, aggregates are selected for asphalt paving applications based on a number of criteria, including physical properties, compatibility with the bitumen to be used in the construction process, availability and ability to provide a finished pavement that meets the performance specifications of the pavement layer for the traffic projected over the design life of the project. Among the aggregate properties that are key to successful road construction is gradation, which refers to the percent of aggregate particles of a given size. For most load-bearing asphalt pavements, three gradations are common: dense-graded, gap-graded and open-graded. Dense-graded aggregate exhibits the greatest mineral surface area per unit of aggregate. Open-graded aggregate largely consists of a single, large-sized (e.g., about 0.375 inch to about 1.0 inch) stone with very low levels (typically less than about 2% of the total aggregate) of fines (material less than 0.25 inch) or filler (mineral material less than 0.075 mm). Gap graded aggregate falls between dense-graded and open-graded classes. Reclaimed asphalt pavement (RAP) material generally reflects the gradation of the pavement from which the reclaimed material is obtained. If the original pavement is a dense-graded mix, the RAP generally will also be dense graded, although the RAP filler fraction is generally observed to be lower than the design limits of the origin aggregate specifications.

Any aggregate which is traditionally employed in the production of bituminous paving compositions is suitable for use in the present invention. These include, but are not limited to, dense-graded aggregate, gap-graded aggregate, open-graded aggregate, stone-matrix asphalt, reclaimed asphalt pavement, reclaimed roofing shingles and mixtures thereof. Aggregate which is not fully dried may also be employed in the present invention.

Bituminous Paving Composition

The invention water-in-oil bitumen dispersion may be produced at the same facility as the bituminous paving composition. The invention dispersion may be produced using several mixing techniques. These include, but are not limited to, mixing the bitumen and water using the following types of mixing equipment: high-shear colloid mills, static in-line mixers, high-shear mixers, and high-shear nozzle devices. Furthermore, the dispersion may be produced by directly injecting water into a process stream of bitumen in such that the shear generated from the water injection sufficiently disperses and mixes water droplets into the bitumen stream and provides bitumen dispersion. The injection of the water into a bitumen process stream may be performed through phase inversion process such as catastrophic or otherwise. The water-in-oil bitumen dispersion may be produced at a temperature range of about 80° C. to about 95° C. using such mixing process, and after production injected into the mixing chamber, where it is mixed with aggregate having a temperature range of about 60° C. to about 140° C. to yield the bituminous paving composition having a temperature range of about 60° C. to about 140° C.

In one embodiment of the present invention, the bituminous paving composition is produced at a temperature range of about 50° C. to about 120° C. by a process comprising a step of mixing:
  (i) water-in-oil bitumen dispersion, having a temperature from about 75° C. to about 95° C., in an amount from about 2% to about 10% by total weight of the bituminous composition; and
  (ii) Aggregate and/or reclaim asphalt pavement, having a temperature from about 60° C. to about 140° C., in an amount from about 90% to about 98% by total weight of the bituminous composition.

In another embodiment, the bituminous compositions are produced by aforementioned process at a temperature in the range of about 55° C. to about 120° C.

Yet in another embodiment, the bituminous compositions are produced by aforementioned process at a temperature in the range of about 60° C. to about 95° C.

In one embodiment, the bituminous compositions are produced by aforementioned process by using the water-in-oil bitumen dispersion in (i) having a temperature in a range of about 85° C. to about 95° C.

In one embodiment, the bituminous compositions are produced by aforementioned process by using the aggregate and/or reclaim asphalt pavement in (ii) having a temperature in a range of about 60° C. to about 120° C.

The invention bituminous composition may include additives introduced with the aggregate feed. Examples of such additives include, but are not limited to, mineral additives such as lime and cement; and fibrous additives such as cellulose, glass and polymer fibers. Additionally, reclaimed asphalt pavement material may be used as additive.

In one embodiment, the invention bituminous composition is applied to the surface to be paved at a temperature range of about 0° C. to about 120° C. In another embodiment, the invention bituminous composition is applied to the surface to be paved at a temperature range of about 85° C. to about 100° C. Yet in another embodiment, the invention bituminous composition is applied to the surface to be paved at a temperature range of about 85° C. to about 95° C.

Once applied to the surface to be paved, the invention bituminous compositions may be compacted as desired using any of the compaction methods known in paving applications.

In one embodiment, the applied bituminous composition is compacted to an air void content comparable to that of hot mix pavement compositions made at temperatures exceeding 140° C. and having substantially equivalent aggregate gradation and bitumen content.

In one embodiment, the applied bituminous composition is compacted to develop load-bearing strength at a rate comparable to that of hot mix pavement compositions made at temperatures exceeding 140° C. and having substantially equivalent aggregate gradation and bitumen content.

The method of the present invention is suitable for use in thin lift overlay paving applications. Thin lift overlays is a maintenance paving technique that traditionally involves the placement of a thin lift of a bituminous composition produced according to standard hot-mix procedures at temperatures normally exceeding 165° C. and applied at corresponding temperatures in the field to an existing, damaged pavement surface. The current thin lift technology using hot-mix bituminous compositions commonly suffers from two major deficiencies. First, the hot bituminous composition tends to cool quickly, making it difficult to extend (i.e., spread) at ambient temperatures onto the existing pavement surface needed of repair. This rapid cooling of the thin lift made of hot bituminous material can also result in relatively poor compaction. The problems that arise in construction (e.g., extension, spreading and compaction) due to rapid cooling can be aggravated when polymer-modified bitumens are used. Polymer-modified bitumens have higher viscosities than unmodified bitumens at a given temperature. Thus, hot-mix bituminous compositions (mixtures with aggregate) made with polymer-modified bitumens are more viscous than equivalent bituminous compositions made with unmodified bitumen at a given construction temperature. As a result of increased viscosity and resistance to flow, a thin lift bituminous composition made with polymer-modified bitumen exhibits even greater problems in handling and construction.

Where desired, the methods and bituminous compositions of the present invention may be employed in the production of bituminous paving blocks. In this technology, water-in-oil bitumen dispersion and aggregate are mixed to form a bituminous composition that is cast in molds, compacted, and allowed to cure. The cured blocks (or bricks) are used to construct pavements. In one embodiment, the invention bituminous composition is cast in the mold and compacted at a temperature range of about 50° C. to about 120° C. In another embodiment, the invention bituminous composition is cast in the mold and compacted at a temperature range of about 80° C. to about 100° C.

Due to the enhanced compaction (leading to higher density and higher strength) and accelerated cure rates (leading to increased production rates and improved manufacturing economics) exhibited by the bituminous compositions of the present invention, the methods and bituminous compositions of the present invention offers improvements over the construction of these blocks using traditional cold mix paving compositions.

Where desired, the methods and bitumen dispersions of the present invention can be used in in-situ production of bituminous compositions. Such in-situ operations include on-site recycling operations such as hot in-place recycling where an aged, distressed pavement may be heated with a variety of portable heater units, scarified, and re-combined with bitumen material to create a rejuvenated paving composition. The rejuvenated paving composition is extended over the width of the traffic lane and compacted to create a rejuvenate pavement riding surface.

In one embodiment, the invention bituminous composition may be maintained at a temperature range of about 50° C. to about 120° C. for the period of time between the production of the bituminous compositions and their use in paving applications. In another embodiment, the invention bituminous composition may be maintained at a temperature range of about 80° C. to about 100° C. The invention bituminous composition may be maintained at these temperatures in closed systems (such as relatively large stockpiles, storage silos, covered transport vehicles, and the like) to prevent evaporation of moisture.

Methods and equipment known for mixing bitumen dispersion and aggregate that are stationary or mobile may be used in the production of invention bituminous paving compositions, such as pug mills of batch, drum, or continuous variety. The term "mobile" includes, but is not limited to, equipments used in-situ and in-place operations. Pug mills impart high shear to the dispersion as it is ground with coarse aggregate and/or RAP, fines, and filler. In these high shear mixers, aggregate and/or RAP (which is heated in the drum or batch mixer to the specified process temperatures) tumbles down the inclined drum while bitumen dispersion is sprayed onto the warm aggregate and/or RAP, giving dispersion-treated aggregate and/or RAP that tumbles downward through the drum mixer. The interior wall of most drum mixers is lined with vanes that repeatedly catch the mix, lift it up as the drum rotates, and deposit it back to the bottom of the drum. Drum and batch plants are capable of throughput of many hundred tons of paving material per hour.

Typically, the bitumen emulsion having traditional emulsifier/surfactant package is coarsened under mechanical stress imparted by mixing the emulsion with aggregate at elevated temperatures. Therefore, its efficiency in aggregate coating is reduced and the viscosity of bituminous composition making thereof increases. As the viscosity of the bituminous composition increases, the densification of paving composition during compaction deteriorates, resulting in a number of pavement distress problems such as rutting, pothole formation, and raveling. While the use of high surfactant dosages can mitigate this coarsening, such dosages can also retard the development of compressive strength and yield undesirable outcome.

The surfactant packages use in the present invention impart high-temperature rheological properties to the water-in-bitumen dispersion and stabilize the dispersion against coarsening. The interfacial rheology of the disperse-phase water droplets in the bitumen dispersions of the present invention is controlled by the structure and chemistry of the surfactant package. Surfactant structure and chemistry affect the energy required to disperse the surfactant at the interface. Surfactant structure and chemistry determine the shear stability of the water-in-oil bitumen dispersion against rupture under high-temperature shear conditions, such as those exhibited during mixing of dispersions and aggregate at above ambient temperatures. Surfactant structure and packing affect the interfacial fluidity or viscosity. Furthermore, proper choice of surfactant structure affects the magnitude of the effect on the interfacial viscosity.

The following examples are provided to further illustrate the present invention and are not to be construed as limiting the invention in any manner.

In the following examples, the bituminous compositions of bitumen dispersions and aggregate were either mixed with an automated bucket mixer or by hand. The mixtures of bitumen dispersion and aggregate were compacted after preparation while the mixtures were at production temperatures. A Strategic Highway Research Program (SHRP) gyratory compactor (commercially available from Pine Instruments) was used to compact the bituminous compositions into pills at a gyratory angle of 1.25° and a ram pressure of 600 kPa using 30 gyrations. Immediately after compaction, the bituminous composition pills were cured at 25° C. in an oven. After curing, the pills were evaluated for compressive strength (i.e., Marshall stability). A stabilometer, commercially available from Pine Instruments, was used to measure the compressive strength of the compacted specimens.

The aggregate used in Examples 1-3 was crushed granite conforming to gradation and property specifications for a dense-graded, ½-inch nominal paving mixture commonly used for production of pavement wearing courses. All aggregate samples were oven-dried at 110° C. before use to remove moisture.

EXAMPLE 1

The asphalt used was performance-graded asphalt, PG67-22. However, other viscosity-graded, penetration-graded, and performance-graded asphalts were also suitable for use in the production of the invention water-in-oil dispersion. The aggregate used was dense-graded aggregate complying with Superpave aggregate qualities and performance specifications.

Bituminous compositions were prepared by the following procedure:

To 15 parts water containing alkyl polyamine surfactant at pH 2.5 and a temperature of 85° C. was added 85 parts PG 64-22 bitumen pre-heated to 135° C. The bitumen was added slowly so that the temperature of the resulting water-in-bitumen dispersion was maintained below 100° C. Roughly 70 parts of the water-in-bitumen dispersion were added to roughly 1000 parts dense-graded granite aggregate met gradation and property specifications for ½-inch nominal wearing course paving aggregate, and the mixture was heated to 120° C. The composition was mixed 60 seconds to produce bituminous compositions containing about 5.6% bitumen by total weight of the graded aggregate.

The resulting bitumen compositions having a temperature range of about 80° C. to about 95° C. were added to a 100-mm diameter gyratory compaction mold, which had been preheated to 80° C.-95° C. The bitumen compositions were then compacted using 30 gyrations of a SHRP Pine gyratory compactor at 600 kPa pressure and a gyration angle of 1.25°.

The compacted bituminous compositions were then placed in a 25° C. oven and allowed to cure for 24 hours. After curing, the physical and performance properties of the compacted and cured bituminous compositions were measured. Strength properties were those expected for an identically-formulated hot mix asphalt paving composition.

EXAMPLES 2-4

The asphalt used in Examples 2-4 was performance-graded asphalt, PG67-22. However, other viscosity-graded, penetration-graded, and performance-graded asphalts were also suitable for use in the production of the invention water-in-oil dispersion. The aggregate used in Examples 2-4 was dense-graded aggregate complying with Superpave aggregate qualities and performance specifications.

Examples 2 and 3 used high-shear homogenizers. High-shear homogenizers can be fitted with shear heads for a production of water-in-oil bitumen dispersions at atmospheric pressures and temperatures below 100° C. A speed of 16,000 rpm was employed with the serrated shear head used in these experiments. Since these experiments were conducted at atmospheric pressure, the temperatures of dispersion were maintained at levels that would prohibit the vaporization of water from the dispersion. Typically, these temperatures were about 94° C. to about 100° C. Use of a pressure-rated closed system for mixing would allow the use of higher dispersion temperatures under pressure without any loss of water vapor. Target bitumen content of the water-in-oil bitumen dispersion produced in Examples 2 and 3 were about 80-90% by weight of the finished water-in-oil bitumen dispersion.

The surfactant solutions were made by dissolving the appropriate emulsifier package in water and adjusting to various pH levels. Emulsifier dosages in the surfactant solutions were adjusted such that their content in the finished dispersion would be about 0.1-0.5%. Other dosages are appropriate as are other emulsifier packages. The solution pH was adjusted by addition of concentrated hydrochloric acid. The surfactant solutions were heated to roughly 85° C. prior to its use for the production of water-in-oil bitumen dispersion.

The procedure in Examples 2 and 3 involved the following steps: Bitumen was added to a metal vessel secured to a ring stand and heated on a hot plate to the target temperature of about 94° C. to about 100° C. The heated bitumen was stirred in a high-shear mixer with serrated shear head at 16,000 rpm, and the surfactant solution was added. The resulting water-in-oil dispersion was sampled for bitumen content, and then added to dense-graded paving grade aggregate having a temperature of about 60° C. to about 120° C.

EXAMPLE 2: The emulsifier package was a blend of one or more polyethylene polyamine amidoamine condensates of modified fatty acid, and one or more members of long-chain fatty polypropylene polyamines. Members of these classes were discussed in PCT application Ser. No. PCT/US2005/002916.

To make the final total emulsifier dosage roughly 0.3% by weight of the finished water-in-oil dispersion, the concentration of emulsifier in the surfactant solution was roughly 1.5%. For example, 20 grams of heated surfactant solution would contain roughly 0.3 grams of emulsifier package. Thus, 100 grams of the water-in-oil dispersion was comprised of roughly 19.7 grams water, 80 grams bitumen, and 0.3 grams of the above emulsifier/surfactant package.

The surfactant solution was adjusted to pH of about 2.0 by addition of concentrated hydrochloric acid, and heated to 185° C. prior to addition to the bitumen under shear. Once the required amount of surfactant solution was added to the sheared bitumen, the high-shear mixer was turned off.

The warm mix bituminous paving composition was made, as in conventional hot-mix asphalt laboratory production, by adding the water-in-oil bitumen dispersion to pre-heated aggregate in a bucket mixer. For example, 60 grams of water-in-oil dispersion were added to 1000 grams of pre-heated aggregate. Activation of the bucket mixer allowed coating of the aggregate by the water-in-oil bitumen dispersion. The resulting mix had a temperature of roughly about 60° C. to about 82° C.

The resulting mix was suitable for producing compacted warm mix specimens.

EXAMPLE 3: An emulsifier chemical package containing solely polyethylene polyamine amidoamine condensate of fatty acid was used to make a surfactant solution as in Example 1. The surfactant solution resulting from this emulsifier package was also adjusted to pH 2 with hydrochloric acid. Production of the water-in-oil dispersion was achieved as in Example 2 by adding the surfactant solution having a temperature of about 85° C. to the PG67-22 bitumen having a temperature of about to 94° C. under mixing in the high-shear mixer. To make the warm asphalt paving composition, 60 grams of the resulting water-in-oil bitumen dispersion was added to pre-heated aggregate with mixing in a conventional, one-gallon bucket mixer.

The resulting mix was not suitable for producing compacted warm mix specimens as the coating of the aggregate was incomplete. Dense-graded paving compositions must exhibit complete aggregate coating EXAMPLE 4. A 316-SS, static, tube, in-line mixer was affixed via a T-junction to the outlet sides of separate surfactant and bitumen pumps. Surfactant solutions were treated as those described above in Examples 2 and 3 and were co-fed with hot asphalt to the in-line mixer. The surfactant and asphalt feed lines, as well as the in-line mixer were heat-traced to maintain elevated temperatures. A meta-stable water-in-oil dispersion was discharged from the outlet side of the in-line mixer. The resulting meta-stable water-in-oil dispersion was fed directly to a bucket mixer containing pre-heated aggregate to produce a warm asphalt paving composition.

EXAMPLES 5-7

The aggregate used in Examples 5-7 was crushed limestone having a gradation shown in TABLE I.

TABLE I

| Crushed Limestone Gradation | |
| --- | --- |
| Sieve size | Percent Passing |
| 7/8 inches | 100 |
| 5/8 inches | 99.9 |
| 3/8 inches | 77.8 |
| No. 4 | 55.5 |
| No. 10 | 33.8 |
| No. 40 | 19.1 |
| No. 80 | 9.3 |
| No. 200 | 4.5 |

Figure 6:
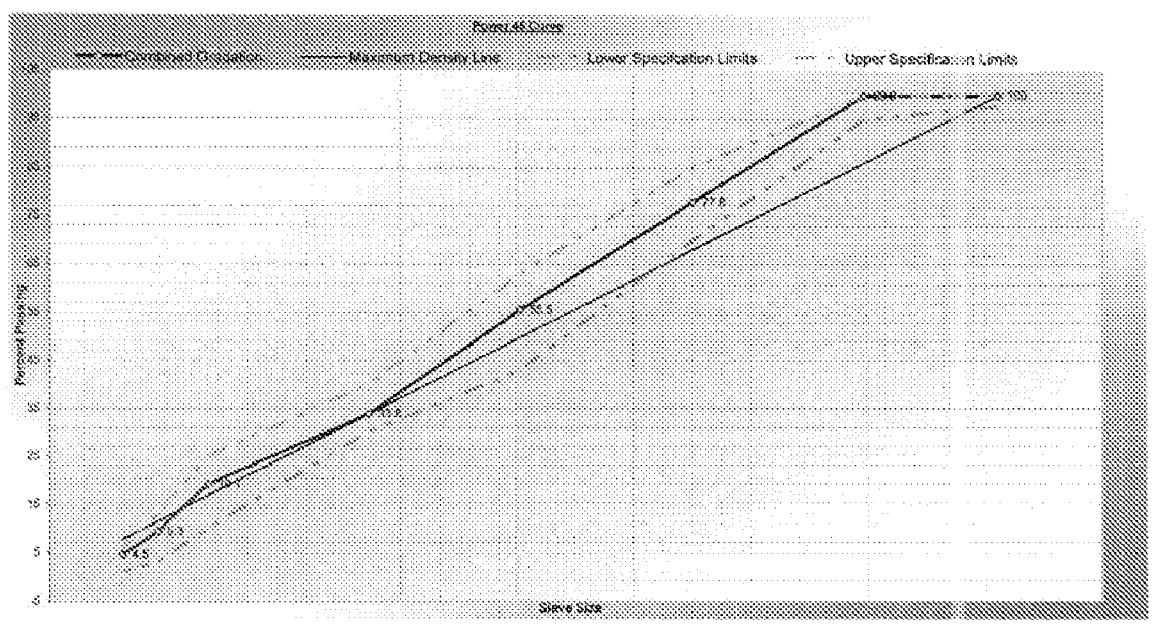
FIG. 6 is a 0.45-power curve graph showing the gradation of the materials used in Examples 4-6.

Materials used in these examples included a Venezuelan bitumen having Superpave grading of PG64-22 and a crushed limestone aggregate having a ⅜-inch Nominal Maximum Aggregate Size (NMAS) following the gradation given in Table I and the 0.45-power curve graph shown in FIG. 6.

Figure 7:
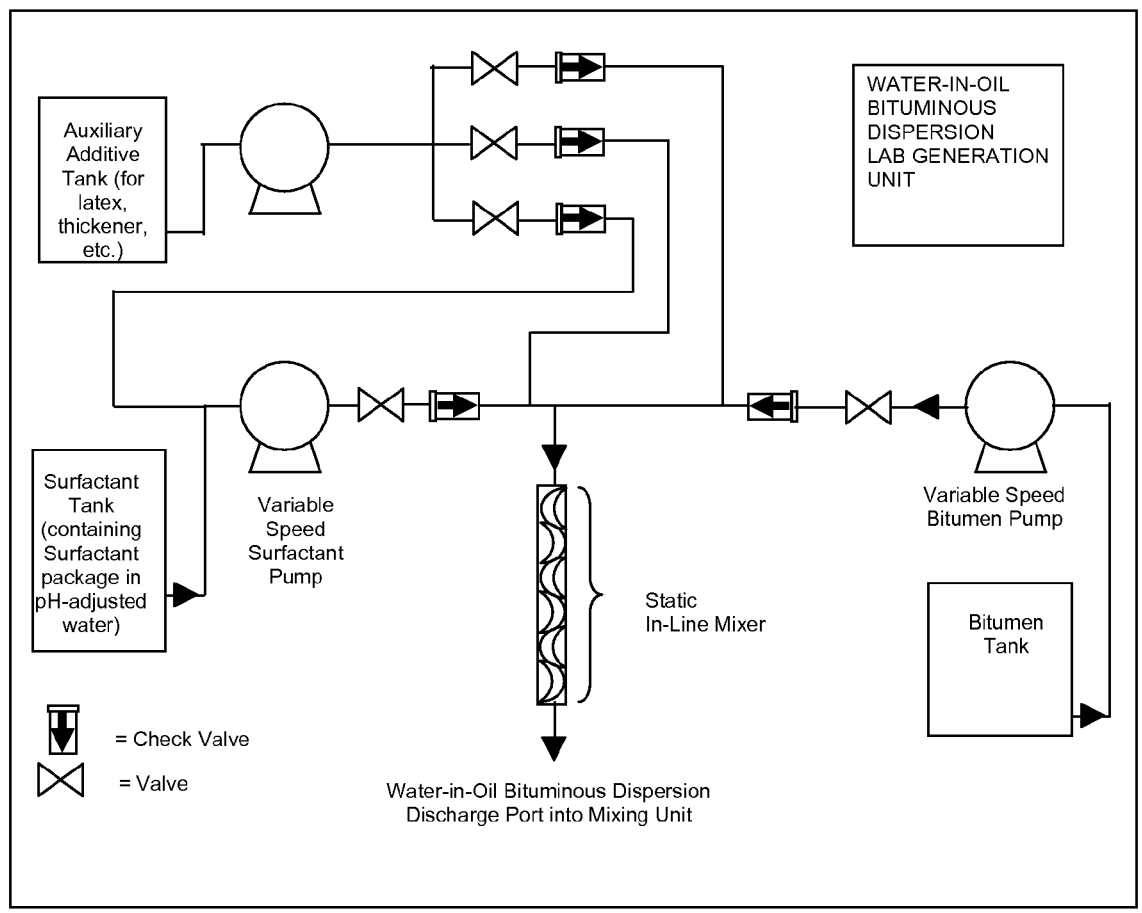
FIG. 7 is a schematic drawing of the static, in-line mixing unit used to conduct the experiments of the present invention.

The water-in-oil bitumen dispersions in these experiments were created using a static, in-line mixing unit shown in the schematic drawing of FIG. 7. The surfactant solutions consisting of a surfactant package dissolved in water were prepared and adjusted to pH of about 2-3. The surfactant package in the surfactant solution was a mixture of roughly 1:1:2 parts respectively of alkyl monoamine, alkyl propylene polyamine, and a polyethylenepolyamine condensate of tall oil fatty acid fortified through Diels-Alder condensation reaction. The surfactant package comprised about 3-10% of the surfactant solution.

compositions made with the water-in-oil bitumen dispersions were comparable to properties of paving compositions of the Hot Mix Asphalt (HMA) Control, which was made via conventional procedures.

EXAMPLE 7

Example 7 utilized the same formulation and process conditions as Example 4. However, in Example 7, styrene-butadiene latex commonly used in the bituminous paving industry was added to the surfactant solution in the quantity indicated in TABLE II, giving water-in-oil bitumen dispersion contained polymer-modified bitumen. The volumetric properties were again comparable to those of the Hot-Mix Asphalt (HMA) control.

TABLE II

| EXPERIMENT | HMA Control | 3 | 4 | 5 | 6 | 7 |
|---|---|---|---|---|---|---|
| Soap Temp. (° C.) | — | 30-40 | 30-40 | 30-40 | 30-40 | 30-40 |
| Surfactant Package (% w/w Soap) | — | 3.3 | 3.3 | 6.6 | 9.9 | 3.3 |
| Styrene-Butadiene Latex (% w/w Soap) | — | 0 | 0 | 0 | 0 | 11.3 |
| Ratio of Soap Feed to Bitumen Feed | — | 15:85 | 15:85 | 10:90 | 5:95 | 15:85 |
| Bitumen Temp. (° C.) | 160 | 130-140 | 130-140 | 130-140 | 130-140 | 130-140 |
| Aggregate Temp. (° C.) | 160 | 80 | 120 | 100 | 100 | 100 |
| Mix Temp. (° C.) | 160 | 85 | 107 | 100 | 107 | 100 |
| Mold Temp (° C.) | 150 | 80 | 95 | 95 | 95 | 95 |
| Compacted Mix Density at N-initial$^a$ | 88.4 | 88.9 | 88.6 ± 0.2 | 89.0 ± 0.0 | 88.3 ± 0.0 | 88.7 |
| Compacted Mix Density at N-des$^a$ | 95.1 | 96.6 | 96.0 ± 0.1 | 96.5 ± 0.4 | 95.8 ± 0.2 | 96.1 |
| Compacted Mix Density at N-max$^a$ | 96.2 | 97.6 | 97.1 ± 0.1 | 97.6 ± 0.5 | 96.9 ± 0.3 | 97.0 |
| Strength (psi) at N-max | 192 | 175 | 166 | 202 | 182 | 200 |
| Dry Strength (psi) (AASHTO T-283) | 138.2 | — | 100.4 | — | — | — |
| Wet Strength (psi) (AASHTO T-283) | 99.8 | — | 75.3 | — | — | — |
| TSR | 72.0 | — | 75.0 | — | — | — |

$^a$Density as a percent of Gmm (maximum mix specific gravity).

In EXAMPLES 5-7, the surfactant solution and bitumen were fed using separate pumping and delivery systems to the static in-line mixer at a ratio of 15:85, 10:90, and 5:95, respectively. Thus, the resulting water-in-oil bitumen dispersion comprised about 85-95% bitumen and about 5-15% water, along with the surfactant package and mineral acid for pH adjustment. The surfactant package in all three experiments was 0.5% by weight of the finished water-in-oil bitumen dispersion. In these Examples, the resulting water-in-oil bitumen dispersion was discharged directly to a mechanical bucket mixer mixing unit (well known in the asphalt mix industry) which contained aggregate pre-heated to the temperature indicated in TABLE II.

Mixes prepared in the mixing unit were transferred to compaction molds and compacted using the SHRP Pine gyratory compactor, with N-initial, N-design, and N-max equal to 8, 100, and 160 gyrations, respectively. Densities of compacted mixes were measured as were strengths an N-max. Examples 5 and 6 differed in the starting temperature of the aggregate and resulting mix temperatures. In Example 5, the aggregate temperature was 80° C. with a resulting mix temperature of 85° C. In Example 6, the aggregate temperature was 120° C., with a resulting mix temperature of 107° C. The volumetric properties (densities) and TSR values of paving It is to be understood that the foregoing description relates to embodiments are exemplary and explanatory only and are not restrictive of the invention. Any changes and modifications may be made therein as will be apparent to those skilled in the art. Such variations are to be considered within the scope of the invention as defined in the following claims.

What is claimed is:
1. Bituminous composition comprising:
   (a) water-in-oil bitumen dispersion in an amount from about 2% to about 10% by total weight of the bituminous composition, wherein the dispersion comprises:
      (i) bitumen in an amount from about 75% to about 95% by total weight of the bitumen dispersion,
      (ii) surfactant package haying an interfacial tension between the bitumen and water of less than 40 dynes/cm at a temperature of 26° C. and at an aqueous concentration of less than 0.1% weight, in an amount from about 0.05% to about 2% by total weight of the bitumen dispersion,
      (ii) water in an amount to complete the dispersion; and
   (b) aggregate and/or reclaimed asphalt pavement in an amount from about 90% to about 98% by total weight of the bituminous composition.

2. The composition of claim 1, wherein the amount of the bitumen is from about 80% to about 95% by total weight of the bitumen dispersion.

3. The composition of claim 1, wherein the amount of the surfactant package is from about 0.08% to about 0.5% by total weight of the bitumen dispersion.

4. The composition of claim 1, wherein the amount of the surfactant package is from about 0.1% to about 0.75% by total weight of the bitumen dispersion.

5. The composition of claim 1, wherein the bitumen comprises at least one member selected from the group consisting of naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof.

6. The composition of claim 1, wherein the naturally occurring bitumen comprises at least one member selected from the group consisting of lake asphalt, lake asphalt derivative, gilsonite, gilsonite derivative, and combinations thereof.

7. The composition of claim 1, wherein the bitumen comprises at least one member selected from the group consisting of unmodified bitumen, modified bitumen, and combinations thereof.

8. The composition of claim 7, wherein the modified bitumen comprises at least one additive selected from the group consisting of natural rubber, synthetic rubber, plastomer, thermoplastic resin, thermosetting resin, elastomer, and combinations thereof.

9. The composition of claim 7, wherein the modified bitumen comprises at least one additive selected from the group consisting of styrene-butadiene-styrene, styrene-butadiene-rubber, polyisoprene, polybutylene, butadiene-styrene rubber, vinyl polymer, ethylene vinyl acetate, ethylene vinyl acetate derivative, sulfur-containing crosslinker, salt, acid modifier, wax modifier, and combinations thereof.

10. The composition of claim 7, wherein the acid modifier comprises at least one member selected from the group consisting of tall oil acid, distilled tall oil, crude tall oil, tall oil pitch, phosphoric acid derivative of tall oil acids, phosphoric acid derivative of tall oil pitch, polyphosphoric acid, and combinations thereof.

11. The composition of claim 1, wherein the surfactant package comprises one member selected from the group consisting of anionic surfactant, cationic surfactant, amphoteric surfactant, nonionic surfactant, and combinations thereof.

12. The composition of claim 11, wherein the anionic surfactant comprises at least one member selected from the group consisting of saturated C-12 to C-24 fatty acids; unsaturated C-12 to C-24 fatty acids; unsaturated C-12 to C-24 fatty acids modified with at least one member selected from the group consisting of acrylic acid, maleic anhydride, fumaric acid, diene and dieneophile; rosin acids; rosin acids modified with at least one member selected from the group consisting of acrylic acid, maleic anhydride, fumaric acid, diene and dieneophile; natural resinous polymers; Vinsol resins; quebracho resins; tannins; lignous polymers; polyacrylic acid; polyacrylate derivatives; alkyl sulfonates; alkyl benzyl sulfonates; alkyl sulfates; alkyl phosphonates; alkyl phosphates; phenolic resins; and combinations thereof.

13. The composition of claim 11, wherein the anionic surfactant comprises at least one member selected from the group consisting of complexes, addition products, and condensation products formed by a reaction of (i) at least one member selected from the group consisting of natural resinous polymer, Vinsol resin, quebracho resin, tannins and lignin; and (ii) at least one member selected from the group consisting of saturated C10-C24 fatty acids, unsaturated C10-C24 fatty acids, and unsaturated C10-C24 fatty acids modified with at least one member selected from the group consisting of acrylic acid, maleic anhydride, fumaric acid, dienes and dienophiles.

14. The composition of claim 11, wherein the anionic surfactant comprises at least one member selected from the group consisting of sulfate, sultanate, phosphate, and phosphonate derivative of at least one compound selected from the group consisting of lignin, natural resinous polymers, Vinsol resins, quebracho resins, and tannins.

15. The composition of claim 11, wherein the anionic surfactant comprises at least one member selected from the group consisting of sulfate, sulfonate, phosphate, and phosphonate derivative of a member selected from the group consisting of complexes, addition products, and condensation products formed by a reaction of (i) at least one member selected from the group consisting of natural resinous polymer, Vinsol resin, quebracho resin, tannins and lignin; and (ii) at least one member selected from the group consisting of saturated C10-C24 fatty acids, unsaturated C10-C24 fatty acids, and unsaturated C10-C24 fatty acids modified with at least one member selected from the group consisting of acrylic acid, maleic anhydride, fumaric acid, diene and dienophile.

16. The composition of claim 11, wherein the amphoteric surfactant comprises at least one product obtained by (i) modifying C-12 to C-24 fatty acid with at least one member selected from the group consisting of acrylic acid, maleic anhydride, fumaric acid, diene and dieneophile; and then (ii) reacting the resulting modified product with at least one member selected from the group consisting of polyethylene polyamines, lithium C-12 to C-24 alkyl amidopropyl halide methyl carboxylate betaine, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines.

17. The composition of claim 11, wherein the cationic surfactant comprises at least one member selected from the group consisting of fatty imidoamines derived from (i) modifying C-12 to C-24 fatty acids with at least one member selected from the group consisting of acrylic acid, maleic anhydride, fumaric acid, diene and dieneophile, and then (ii) reacting the resulting modified products with polyalkylenepolyamines; fatty amidoamines derived from (i) modifying C-12 to C-24 fatty acids with at least one member selected from the group consisting of acrylic acid, maleic anhydride, fumaric acid, diene and dieneophile; and then (ii) reacting the resulting modified products with at least one member selected from the group consisting of polyalkylenepolyamines, saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines; polyoxyethylene derivatives made by modifying saturated C-12 to C-24 alkyl monoamines with at least one member selected from the group consisting of ethylene oxide and propylene oxide; polyoxyethylene derivatives made by modifying unsaturated C-12 to C-24 alkyl monoamines with at least one member selected from the group consisting of ethylene oxide and propylene oxide;

polyoxyethylene derivatives made by modifying saturated C-12 to C-24 alkyl polypropylenepolyamines with at least one member selected from the group consisting of ethylene oxide and propylene oxide; polyoxyethylene derivatives made by modifying unsaturated C-12 to C-24 alkyl polypropylenepolyamines with at least one member selected from the group consisting of ethylene oxide and propylene oxide; saturated C-12 to C-24 alkyl aryl monoamines; unsaturated C-12 to C-24 alkyl aryl monoamines; saturated C-12 to C-24 alkyl aryl polypropylenepolyamines; unsaturated C-12 to C-24 alkyl aryl polypropylenepolyamines; saturated C-12 to C-24 quaternary amines; unsaturated C-12 to C-24 quaternary amines; amine derivatives of tannins; amine derivatives of phenolic resins; amine derivatives of lignins; amine-modified polyacrylates; and combinations thereof.

18. The composition of claim 11, wherein the cationic surfactant comprises at least one member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof.

19. The composition of claim 11, wherein the cationic surfactant is a blend of at least one member selected from the group consisting of saturated and unsaturated C-12 to C-24 alkyl monoamines, and at least one member selected from the group consisting of saturated and unsaturated C-12 to C-24 alkyl polypropylenepolyamines.

20. The composition of claim 11, herein the nonionic surfactant comprises at least one member selected from the group consisting of alkylaryl polyethylene oxide derivative of alkanol; polypropylene oxide derivative of alkanol; polyethylene oxide derivative of alkanol; polypropylene oxide derivative of alkanol, wherein the alkanol has branched, linear, or cyclic structure; polyethoxylated surfactant; polypropoxylated surfactant; sorbitan esters; monosaccharide derivative; polysaccharide derivative; protein stabilizer; mechanical stabilizers; and combinations thereof.

21. The composition of claim 20, wherein the protein stabilizer comprises at least one member selected from the group consisting of casein, albumin, and combinations thereof.

22. The composition of claim 20, wherein the mechanical stabilizers comprises at least one member selected from the group consisting of phyllosilicate bentonite, montmorillonite clay, and combinations thereof.

23. The composition of claim 11, wherein the nonionic surfactant comprises at least one member selected from the group consisting of alkyl polysaccharide; alkylphenol alkoxylate; fatty alcohol ethoxylate; saturated fatty acid propoxylate; unsaturated fatty acid propoxylate; ethoxylate of escinoleic acid; ethoxylate of castor oil; propoxylate of escinoleic acid; propoxylate of castor oil, wherein the ethoxylate has linear, branched, or cyclic structure, and the propoxylate linear, branched, or cyclic structure.

24. The composition of claim 1, wherein the surfactant package comprises at least one member selected from the group consisting of polyethylene-polypropylene block copolymer; hydroxypoly(oxyethylene) poly(oxypropylene) poly(oxyethylene) block copolymers; 1,2-propyleneglycol ethoxylated; 1,2-propyleneglycol propoxylated; and synthetic block copolymer of ethylene oxide and propylene oxide having molecular weights exceeding 300 g/mole.

25. The composition of claim 1, wherein the surfactant package comprises at least one member selected from the group consisting of decyl alcohol ethoxylates; castor oil ethoxylate; ceto-oleyl alcohol ethoxylate; ethoxylated alkanolamide; fatty alcohol alkoxylates; dinonyl phenol ethoxylate, nonyl phenol ethoxylate; sorbitan ester ethoxylate; alkyl ether sulphate; monoalkyl sulphosuccinamate; alkyl phenol ether sulphate; fatty alcohol sulphate; di-alkyl sulphosuccinate; alkyl ether phosphate; alkyl phenol ether phosphate; alkyl naphthalene sulphonate; α-olefin sulphonate; alkyl benzene sulphonic acids and salt, alkyl ampho(di) acetate; alkyl betaine; alkyl polysaccharide; alkylamine ethoxylate; amine oxide; and combinations thereof.

26. The composition of claim 1, wherein the surfactant package comprises at least one member selected from the group consisting of oligomer, co-oligomer, ter-oligomer, tetra-oligomer, homopolymer, copolymer, terpolymer, and tetrapolymer of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

27. The composition of claim 1, wherein the surfactant package comprises at least one member selected from the group consisting of lithium, sodium, potassium, magnesium, calcium, ammonium, and alkylammonium salts of at least one member selected from the group consisting of oligomers, co-oligomers, ter-oligomers, tetra-oligomers, homopolymers, copolymers, terpolymers, and tetrapolymers of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

28. The composition of claim 1, wherein the surfactant package comprises salt obtained by a reaction of (i) at least one member selected from the group consisting of hydrogen halide, carboxylic acid, and phosphoric acid; and (ii) at least one member selected from the group consisting of oligomers, co-oligomers, ter-oligomers, tetra-oligomers, homopolymers, copolymers, terpolymers, and tetrapolymers of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

29. The composition of claim 1, wherein the surfactant package comprises at least one member selected from the group consisting of oligomeric ethyleneamine, oligomeric polypropyleneamine, hexamethylene diamine, bis-hexamethylene diamine, polyethylene polyamine, polypropylene polyamine, polyethylene/polypropylene polyamine, distillation residue from polyalkylene polyamine manufacture, and higher order polyalkylene polyamine.

30. The composition of claim 1, wherein the surfactant package comprises salt obtained by a reaction of (i) at least one member selected from the group consisting of hydrogen halide, carboxylic acid, and phosphoric acid; and (ii) at least one member selected from the group consisting of oligomeric ethyleneamine, oligomeric polypropyleneamine, hexamethylene diamine, bis-hexamethylene diamine, polyethylene polyamine, polypropylene polyamine, polyethylene/polypropylene polyamine, distillation residue from polyalkylene polyamine manufacture, and higher order polyalkylene polyamine.

31. The composition of claim 1, wherein the surfactant package comprises at least one member selected from the group consisting of monoethoxylated, polyethoxylated, monopropylated, and polypropylated condensate of at least one member selected from the group consisting of oligomeric ethyleneamine, oligomeric polypropyleneamine, hexamethylene diamine, bis-hexamethylene diamine, oligomeric aziridine, polyaziridine, polyethylene polyamine, polypropylene polyamine, polyethylene/polypropylene polyamine, distillation residue from polyalkylene polyamine manufacture, and higher order polyalkylene polyamine.

32. The composition of claim 1, wherein the surfactant package comprises salt obtained by a reaction of (i) at least one member selected from the group consisting of hydrogen halide, carboxylic acid, and phosphoric acid; and (ii) at least one member selected from the group consisting of monoethoxylated polyethoxylated, monopropylated, and polypropylated condensates of at least one compound selected from the group consisting of oligomeric ethyleneamine, oligomeric polypropyleneamine, hexamethylene diamine, bis-hexamethylene diamine, oligomeric aziridine, polyaziridine, polyethylene polyamine, polypropylene polyamine, polyethylene/polypropylene polyamine, distillation residue from polyalkylene polyamine manufacture, and higher order polyalkylene polyamine.

33. The composition of claim 1, wherein the surfactant package comprises homolog of hydroxylalkyl amine.

34. The composition of claim 1, wherein the surfactant package comprises salt obtained by a reaction of (i) homolog of hydroxyalkyl amine and (ii) at least one member selected from the group consisting of hydrogen halide, carboxylic acid and phosphoric acid.

35. The composition of claim 1, wherein the surfactant package comprises at least one member selected from the group consisting of C-36 dimeric fatty acid and C-54 trimeric fatty acid.

36. The composition of claim 1, wherein the surfactant package comprises polymeric condensation product of C-36 dimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

37. The composition of claim 1, wherein the surfactant package comprises salt obtained by a reaction of (i) at least one member selected from the group consisting of hydrogen halide, carboxylic acid, and phosphoric acid; and (ii) at least one member selected from the group consisting of polymeric condensation product of C-36 dimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

38. The composition of claim 1, wherein the surfactant package comprises polymeric condensation product of C-54 trimeric fatty acids and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

39. The composition of claim 1, wherein the surfactant package comprises salt obtained by a reaction of (i) at least one member selected from the group consisting of hydrogen halide, carboxylic acid, and phosphoric acid; and (ii) at least one member selected from the group consisting of polymeric condensation product of C-54 trimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

40. The composition of claim 1, wherein the surfactant package comprises at least one member selected from the group consisting of hydroxystearic acid, oligomer of hydroxystearic acid, and polymeric hydroxystearic acid.

41. The composition of claim 1, wherein the surfactant package comprises polymeric condensation product formed by a reaction of (i) at least one member selected from the group consisting of ethylene amine, propylene amine, ethylene/propylene amine, oligomeric ethyleneamine, polyethylene polyamine, oligomeric propylene amine, distillation residue from polyalkylene polyamine manufacture, and higher order polyalkylene polyamine; and (ii) at least one member selected from the group consisting of hydroxystearic acid, oligomer of hydroxystearic acid, and polymeric hydroxystearic acid.

42. The composition of claim 1, the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of lithium hydroxide, sodium hydroxide, potassium hydroxide, and Lewis acid base.

43. The composition of claim 1, wherein the surfactant package comprises ethoxytrimethyleneamine derivatives of C-12 to C-24 fatty amines of structure (I)

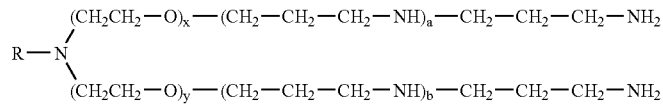

wherein
R=saturated or unsaturated aliphatic C-12 to C-24 having linear, branched, or cyclic structure;
$x+y \geq 2$; and
$a, b \geq 0$.

44. The composition of claim 1, wherein the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of ethoxytrimethyleneamine derivatives of C-12 to C-24 fatty amines of structure (I).

45. The composition of claim 1, wherein the surfactant package comprises propoxytrimethyleneamine derivatives of C-12 to C-24 fatty amines of structure (II)

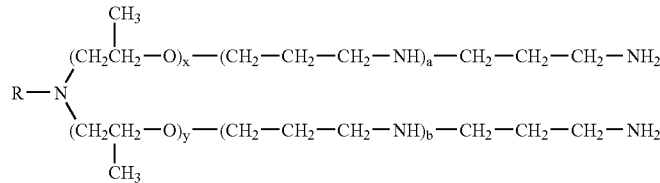

wherein
R=saturated or unsaturated aliphatic C-12 to C-24 having linear, branched, or cyclic structure;
$x+y \geq 2$; and
$a, b \geq 0$.

46. The composition of claim 1, wherein the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of propoxytrimethyleneamine derivative of C-12 to C-24 fatty amine of structure (II).

47. The composition of claim 1, wherein the surfactant package comprises aliphatic dialkylamine of structure (III)

wherein
$R^1$, $R^2$=saturated or unsaturated C-12 to C-24 moieties having linear, branched, or cyclic structure.

48. The composition of claim 1, wherein the surfactant package comprises salt obtained by the reaction of (i) at least one member selected from the group consisting of hydrogen halide, carboxylic acid, and phosphoric acid; and (ii) at least one member selected from the group consisting of saturated and unsaturated aliphatic C-12 to C-24 dialkyl amine of structure (III).

49. The composition of claim 1, wherein the surfactant package comprises quaternary amine of structure (IV)

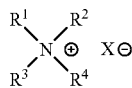

wherein
$R^1$, $R^2$=saturated or unsaturated aliphatic C-12 to C-24 moieties having linear, branched, or cyclic structure; and
$R^3$, $R^4$=methyl or higher order homolog of saturated or unsaturated aliphatic C-12 to C-24 moieties having linear, branched, or cyclic structure.

50. The composition of claim 1, wherein the surfactant package comprises salt obtained by the reaction of (i) at least one member selected from the group consisting of hydrogen halide, carboxylic acid, and phosphoric acid; and (ii) at least one member selected from the group consisting of saturated and unsaturated aliphatic C-12 to C-24 alkyl quaternary amine of structure (IV).

51. The composition of claim 1, wherein the surfactant package comprises quaternary amine of structure (V)

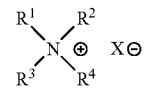

wherein:
$R^1$, $R^2$=saturated or unsaturated aliphatic C-12 to C-24 moieties having linear, branched, or cyclic structure; and
$R^3$, $R^4$=ethoxy moieties, propoxy moieties, or combinations thereof.

52. The composition of claim 1, wherein the surfactant package comprises salt obtained by the reaction of (i) at least one member selected from the group consisting of hydrogen halide, carboxylic acid, and phosphoric acid; and (ii) at least one member selected from the group consisting of saturated and unsaturated aliphatic C-12 to C-24 alkyl quaternary amine of structure (V).

53. The composition of claim 1, wherein the surfactant package comprises bisamide formed by a reaction of polyalkylenepolyamine and adduct obtained by modifying at least one member selected from the group consisting of saturated aliphatic C-12 to C-24 fatty acid and unsaturated aliphatic C-12 to C-24 fatty acids with at least one member selected from the group consisting of acrylic acid, maleic anhydride, fumaric acid, diene and dieneophiles, wherein the C-12 to C-24 fatty acid has linear, branched, or cyclic structure.

54. The composition of claim 1, wherein the surfactant package comprises salt obtained by the reaction of (i) at least one member selected from the group consisting of hydrogen halide, carboxylic acid, and phosphoric acid; and (ii) at least one member selected from the group consisting of bisamide formed by a reaction of polyalkylenepolyamine and adduct obtained by modifying at least one member selected from the group consisting of saturated aliphatic C-12 to C-24 fatty acid and unsaturated aliphatic C-12 to C-24 fatty acids with at least one member selected from the group consisting of acrylic acid, maleic anhydride, fumaric acid, diene and dieneophiles, wherein the C-12 to C-24 fatty acid has linear, branched, or cyclic structure.

55. The composition of claim 1, wherein the surfactant package comprises dialkylarylamine.

56. The composition of claim 1, wherein the surfactant package comprises salt obtained by the reaction of at least one member selected from the group consisting of hydrogen halide, carboxylic acid, and phosphoric acid; and dialkylarylamine.

57. The composition of claim 1, wherein the surfactant package has an interfacial tension between the bitumen and water of less than 30 dynes/cm at a temperature of 26° C. and at an aqueous concentration of less than 0.1% weight.

58. The composition of claim 1, wherein the surfactant package has an interfacial tension between the bitumen and water of less than 20 dynes/cm at a temperature of 26° C. and at an aqueous concentration of less than 0.1% weight.

59. The composition of claim 1, wherein the surfactant package has an interfacial tension between the bitumen and water of less than 10 dynes/cm at a temperature of 26° C. and at an aqueous concentration of less than 0.1% weight.

60. The composition of claim 1, wherein the surfactant package has an interfacial tension between the bitumen and water of less than 5 dynes/cm at a temperature of 26° C. and at an aqueous concentration of less than 0.1% weight.

61. The composition of claim 1, wherein the water-in-oil bitumen dispersion comprises organic solvent in an amount of less than or equal to 4% by weight by total weight of the dispersion.

62. The composition of claim 1, wherein the water-in-oil bitumen dispersion comprises organic solvent in an amount of less than or equal to 1% by weight by total weight of the dispersion.

63. The composition of claim 1, wherein the aggregate comprises at least one member selected from the group consisting of dense-graded aggregate, gap-graded aggregate, open-graded, stone-matrix aggregate, reclaimed asphalt paving material, reclaimed roofing shingles, and combinations thereof.

64. The composition of claim 1, further comprising additive for enhancing processability or improving performance.

65. The composition of claim 1, wherein the water-in-oil bitumen dispersion is produced using high-shear mixing process comprising at least one member selected from the group consisting of high-shear colloid mill dispersion, high-shear static mixer dispersion, high-shear roto-mixer dispersion, high-shear dispersion via injection of the water into a bitumen process stream through phase inversion process, and combinations thereof.

66. The composition of claim 1, characterized by its application to a surface being paved at a temperature in a range of about 0° C. to about 120° C.

67. The composition of claim 1, characterized by its application to a surface being paved at a temperature in a range of about 85° C. to about 100° C.

68. The composition of claim 1, characterized by its application to a surface being paved at a temperature in a range of about 85° C. to about 95° C.

69. A thin lift overlay for paving applications comprising the bituminous composition of claim 1.

70. A bituminous paving block comprising the bituminous composition of claim 1.

71. A method for producing a bituminous composition comprising steps of:
(A) preparing water-in-oil bituminous dispersion comprising:
(i) bitumen, in an amount from about 75% to about 95% by total weight of the bitumen dispersion,
(ii) surfactant package having an interfacial tension between the bitumen and water of less than 40 dynes/cm at a temperature of 26° C. and at an aqueous concentration of less than 0.1% weight, in an amount from about 0.05% to about 2% by total weight of the bitumen dispersion, and
(iii) water in an amount to complete the dispersion; and
(B) producing the bituminous composition having a temperature from about 50° C. to about 120° C. by mixing:
(i) the water-in-oil bitumen dispersion of step (A), having a temperature from about 75° C. to about 95° C., in an amount from about 2% to about 10% by total weight of the bituminous composition, and
(ii) aggregate and/or reclaimed asphalt pavement, having a temperature from about 60° C. to about 140° C., in an amount from about 90% to about 98% by total weight of the bituminous composition.

72. The method of claim 71, wherein the produced bituminous composition has a temperature in the range of about 55° C. to about 120° C.

73. The method of claim 71, wherein the produced bituminous composition has a temperature in the range of about 60° C. to about 95° C.

74. The method of claim 71, wherein the water-in-oil bitumen dispersion of step (B) (i) has a temperature in the range of about 85° C. to about 95° C.

75. The method of claim 71, wherein the aggregate and/or reclaimed asphalt pavement of step (B) (ii) has a temperature in the range of about 60° C. to about 120° C.

76. The method of claim 71, wherein the water-in-oil bituminous dispersion is delivered after production directly into at least one stationary or mobile asphalt mixing unit, wherein the mixing unit comprises at least one member selected from the group consisting of drum mixers, pug-mill batch mixers, dual mixers, and combinations thereof, and wherein the mobile mixing unit comprises equipment used in in-situ or in-place operations.

77. A paved road comprising at least one layer of a bituminous composition, wherein the bituminous composition comprises:
a, water-in-oil bitumen dispersion in an amount from about 2% to about 10% by total weight of the bituminous composition, wherein the dispersion comprises:
(i) bitumen, in an amount from about 75% to about 95% by total weight of the bitumen dispersion,
(ii) surfactant package having an interfacial tension between the bitumen and water of less than 40 dynes/cm at a temperature of 26° C. and at an aqueous concentration of less than 0.1% weight, in an amount from about 0.05% to about 2% by total weight of the bitumen dispersion,
(iii) water in an amount to complete the dispersion; and
b. aggregate and/or reclaimed asphalt pavement in an amount from about 90% to about 98% by total weight of the bituminous composition.

78. The paved road of claim 77, wherein an amount of the bitumen in the dispersion is from about 80% to about 95% by total weight of the bitumen dispersion.

79. The paved road of claim 77, wherein an amount of he surfactant package in the dispersion is from about 0.08% to about 0.5% by total weight of the bitumen dispersion.

80. The paved road of claim 77, wherein an amount of the surfactant package in the dispersion is from about 0.1% to about 0.75% by total weight of the bitumen dispersion.

81. The paved road of claim 77, wherein the bitumen comprises at least one member selected from the group consisting of naturally occurring bitumen, bitumen derived from crude oil, petroleum pitches obtained from a cracking process, coal tar, polymer-modified bitumen, rubberized bitumen, rubberized bitumen containing recycled tire material, acid-modified bitumen, wax-modified bitumen, and combinations thereof.

82. The paved road of claim 81, wherein the naturally occurring bitumen comprises at least one member selected from the group consisting of lake asphalt, lake asphalt derivative, gilsonite, gilsonite derivative, and combinations thereof.

83. The paved road of claim 77, wherein the bitumen comprises at least one member selected from the group consisting of unmodified bitumen, modified bitumen, and combinations thereof.

84. The paved road of claim 83, wherein the modified bitumen comprises at least one additive selected from the group consisting of natural rubber, synthetic rubber, plastomer, thermoplastic resin, thermosetting resin, elastomer, and combinations thereof.

85. The paved road of claim 83, wherein the modified bitumen comprises at least one additive selected from the group consisting of styrene-butadiene-styrene, styrene-butadiene-rubber, polyisoprene, polybutylenes, butadiene-styrene rubbers, vinyl polymers, ethylene vinyl acetate, ethylene vinyl acetate derivatives, sulfur-containing crosslinker, salts acid modifier, wax modifier, and combinations thereof.

86. The paved road of claim 85, wherein the acid modifier comprises at least one member selected from the group consisting of tall oil acid, crude tall oil, tall oil pitch, phosphoric acid derivative of tall oil acids, phosphoric acid derivative of tall oil pitch, polyphosphoric acid, and combinations thereof.

87. The paved road of claim 77, wherein the surfactant package comprises at least one member selected from the group consisting of anionic surfactant, cationic surfactant, amphoteric surfactant, nonionic surfactant, and combinations thereof.

88. The paved road of claim 87, wherein the anionic surfactant comprises at least one member selected from the group consisting of saturated C-12 to C-24 fatty adds; unsaturated C-12 to C-24 fatty acids; unsaturated C-12 to C-24 fatty acids modified with at least one member selected from the group consisting of acrylic acid, maleic anhydride, fumaric acid, diene and dieneophile; rosin acids; rosin acids modified with at least one member selected from the group consisting of acrylic acid, maleic anhydride, fumaric acid, diene and dieneophile; natural resinous polymers; Vinsol resins; quebracho resins; tannins; lignous polymers; polyacrylic acid; polyacrylate derivatives; alkyl sultanates; alkyl benzyl sulfonates; alkyl sulfates; alkyl phosphonates; alkyl phosphates; phenolic resins; and combinations thereof.

89. The paved road of claim 87, wherein the anionic surfactant comprises at least one member selected from the group consisting of complexes, addition products, and condensation products formed by a reaction of (i) at least one member selected from the group consisting of natural resinous polymer, Vinsol resin, quebracho resin, tannins and lignin; and (ii) at least one member selected from the group consisting of saturated C10-C24 fatty acids, unsaturated C10-C24 fatty acids, and unsaturated C10-C24 fatty acids modified with at least one member selected from the group consisting of acrylic acid, maleic anhydride, fumaric acid, dienes and dienophiles.

90. The paved road of claim 87, wherein the anionic surfactant comprises at least one member selected from the group consisting of sulfate, sulfonate, phosphate, and phosphonate derivative of at least one compound selected from the group consisting of lignin, natural resinous polymers, Vinsol resins, quebracho resins, and tannins.

91. The paved road of claim 87, wherein the anionic surfactant comprises at least one member selected from the group consisting of sulfate, sulfonate, phosphate, and phosphonate derivative of a member selected from the group consisting of complexes, addition products, and condensation products formed by a reaction of (i) at least one member selected from the group consisting of natural resinous polymer, Vinsol resin, quebracho resin, tannins and lignin; and (ii) at least one member selected from the group consisting of saturated C10-C24 fatty acids, unsaturated C10-C24 fatty acids, and unsaturated C10-C24 fatty acids modified with at least one member selected from the group consisting of acrylic acid, maleic anhydride, fumaric acid, diene and dienophile.

92. The paved road of claim 87, wherein the amphoteric surfactant comprises at least one product obtained by (i) modifying C-12 to C-24 fatty acid with at least one member selected from the group consisting of acrylic acid, maleic anhydride, fumaric acid, diene and dieneophile; and then (ii) reacting the resulting modified product with at least one member selected from the group consisting of polyethylene polyamines, lithium C-12 to C-24 alkyl amidopropyl halide methyl carboxylate betaine, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines.

93. The paved road of claim 87, wherein the cationic surfactant comprises at least one member selected from the group consisting of fatty imidoamines derived from (i) modifying C-12 to C-24 fatty acids with at least one member selected from the group consisting of acrylic acid, maleic anhydride, fumaric acid, diene and dieneophile, and then (ii) reacting the resulting modified products with polyalkylenepolyamines; fatty amidoamines derived from (i) modifying C-12 to C-24 fatty acids with at least one member selected from the group consisting of acrylic acid, maleic anhydride, fumaric acid, diene and dieneophile; and then (ii) reacting the resulting modified products with at least one member selected from the group consisting of polyalkylenepolyamines, saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines; polyoxyethylene derivatives made by modifying saturated C-12 to C-24 alkyl monoamines with at least one member selected from the group consisting of ethylene oxide and propylene oxide; polyoxyethylene derivatives made by modifying unsaturated C-12 to C-24 alkyl monoamines with at least one member selected from the group consisting of ethylene oxide and propylene oxide; polyoxyethylene derivatives made by modifying saturated C-12 to C-24 alkyl polypropylenepolyamines with at least one member selected from the group consisting of ethylene oxide and propylene oxide; polyoxyethylene derivatives made by modifying unsaturated C-12 to C-24 alkyl polypropylenepolyamines with at least one member selected from the group consisting of ethylene oxide and propylene oxide; saturated C-12 to C-24 alkyl aryl monoamines; unsaturated C-12 to C-24 alkyl aryl monoamines; saturated C-12 to C-24 alkyl aryl polypropylenepolyamines; unsaturated C-12 to C-24 alkyl aryl polypropylenepolyamines; saturated C-12 to C-24 quaternary amines; unsaturated C-12 to C-24 quaternary amines; amine derivatives of tannins; amine derivatives of phenolic resins; amine derivatives of lignins; amine-modified polyacrylates; and combinations thereof.

94. The paved road of claim 87, wherein the cationic surfactant comprises at least one member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof.

95. The paved road of claim 87, wherein the cationic surfactant is a blend of at least one member selected from the group consisting of saturated and unsaturated C-12 to C-24 alkyl monoamines, and at least one member selected from the group consisting of saturated and unsaturated C-12 to C-24 alkyl polypropylenepolyamines.

96. The paved road of claim 87, wherein the nonionic surfactant comprises at least one member selected from the group consisting of alkylaryl polyethylene oxide derivative of alkanol; polypropylene oxide derivative of alkanol; polyethylene oxide derivative of alkanol; polypropylene oxide derivative of alkanol, wherein the alkanol has branched, linear, or cyclic structure; polyethoxylated surfactant; polypropoxylated surfactant; sorbitan esters; monosaccharide derivative; polysaccharide derivative; protein stabilizer; mechanical stabilizers; and combinations thereof.

97. The paved road of claim 96, wherein the protein stabilizer comprises at least one member selected from the group consisting of casein, albumin, and combinations thereof.

98. The paved road of claim 96, wherein the mechanical stabilizers comprises at least one member selected from the group consisting of phyllosilicate bentonite, montmorillonite clay, and combination thereof.

99. The paved road of claim 87, wherein the nonionic surfactant comprises at least one member selected from the group consisting of alkyl polysaccharide; alkylphenol alkoxylate; fatty alcohol ethoxylate; saturated fatty acid propoxylate; unsaturated fatty acid propoxylate; ethoxylate of escinoleic acid; ethoxylate of castor oil; propoxylate of escinoleic acid; propoxylate of castor oil, wherein the ethoxylate has linear, branched, or cyclic structure, and the propoxylate linear, branched, or cyclic structure.

100. The paved road of claim 77, wherein the surfactant package comprises at least one member selected from the group consisting of polyethylene-polypropylene block copolymer, hydroxypoly(oxyethylene) poly(oxypropylene) poly(oxyethylene) block copolymers, 1,2-propyleneglycol ethoxylated, 1,2-propyleneglycol propoxylated; and synthetic block copolymer of ethylene oxide and propylene oxide having molecular weights exceeding 300 g/mole.

101. The paved road of claim 77, wherein the surfactant package comprises at least one member selected from the group consisting of decyl alcohol ethoxylates; castor oil ethoxylate; ceto-oleyl alcohol ethoxylate; ethoxylated alkanolamide; fatty alcohol alkoxylates; dinonyl phenol ethoxylate, nonyl phenol ethoxylate; sorbitan ester ethoxylate; alkyl ether sulphate; monoalkyl sulphosuccinamate; alkyl phenol ether sulphate; fatty alcohol sulphate; di-alkyl sulphosuccinate; alkyl ether phosphate; alkyl phenol ether phosphate; alkyl naphthalene sulphonate; α-olefin sulphonate; alkyl benzene sulphonic acids and salt, alkyl ampho(di)acetate; alkyl betaine; alkyl polysaccharide; alkylamine ethoxylate; amine oxide; and combinations thereof.

102. The paved road of claim 77, wherein the surfactant package comprises at least one member selected from the group consisting of oligomer, co-oligomer, ter-oligomer, tetra-oligomer, homopolymer, copolymer, terpolymer, and tetrapolymer of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

103. The paved road of claim 77, wherein the surfactant package comprises at least one member selected from the group consisting of lithium, sodium, potassium, magnesium, calcium, ammonium, and alkylammonium salts of at least one member selected from the group consisting of oligomers, co-oligomers, ter-oligomers, tetra-oligomers, homopolymers, copolymers, terpolymers, and escinoleic of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

104. The paved road of claim 77, wherein the surfactant package comprises salt obtained by a reaction of (i) at least one member selected from the group consisting of hydrogen halide, carboxylic acid, and phosphoric acid; and (ii) at least one member selected from the group consisting of oligomers, co-oligomers, ter-oligomers, tetra-oligomers, homopolymers, copolymers, terpolymers, and escinoleic of at least one monomer selected from the group consisting of acrylic acid, alkylacrylic acid, alkyl ester of acrylic acid, alkyl ester of alkylacrylic acid, hydroxyalkyl ester of acrylic acid, hydroxyalkyl ester of alkylacrylic acid, acrylamide, alkylacrylamide, N-alkyl acrylamide, N,N-dialkyl acrylamdide, N-hydroxyalkylacrylamide, N,N-dihydroxyalkylacrylamide, styrene, alkylstyrene, ethene, propene, higher order alkene, diene, hydroxylated propene, polyhyrdoxylated polyalkene, halogenated ethylene, halogenated propylene, and halogenated alkylidene.

105. The paved road of claim 77, wherein the surfactant package comprises at least one member selected from the group consisting of oligomeric ethyleneamine, oligomeric polypropyleneamine, hexamethylene diamine, bis-hexamethylene diamine, polyethylene polyamine, polypropylene polyamine, polyethylene/polypropylene polyamine, distillation residue from polyalkylene polyamine manufacture, and higher order polyalkylene polyamine.

106. The paved road of claim 77, wherein the surfactant package comprises salt obtained by a reaction of (i) at least one member selected from the group consisting of hydrogen halide, carboxylic acid, and phosphoric acid; and (ii) at least one member selected from the group consisting of oligomeric ethyleneamine, oligomeric polypropyleneamine, hexamethylene diamine, bis-hexamethylene diamine, polyethylene polyamine, polypropylene polyamine, polyethylene/polypropylene polyamine, distillation residue from polyalkylene polyamine manufacture, and higher order polyalkylene polyamine.

107. The paved road of claim 77, wherein the surfactant package comprises at least one member selected from the group consisting of monoethoxylated polyethoxylated, monopropylated, and polypropylated condensate of at least one member selected from the group consisting of oligomeric ethyleneamine, oligomeric polypropyleneamine, hexamethylene diamine, bis-hexamethylene diamine, oligomeric aziridine, polyaziridine, polyethylene polyamine, polypropylene polyamine, polyethylene/polypropylene polyamine, distillation residue from polyalkylene polyamine manufacture, and higher order polyalkylene polyamine.

108. The paved road of claim 77, wherein the surfactant package comprises salt obtained by a reaction of (i) at least one member selected from the group consisting of hydrogen halide, carboxylic acid, and phosphoric acid; and (ii) at least one member selected from the group consisting of monoethoxylated, polyethoxylated, monopropylated, and polypropylated condensates of at least one compound selected from the group consisting of oligomeric ethyleneamine, oligomeric polypropyleneamine, hexamethylene diamine, bis-hexamethylene diamine, oligomeric aziridine, polyaziridine, polyethylene polyamine, polypropylene polyamine, polyethylene/polypropylene polyamine, distillation residue from polyalkylene polyamine manufacture, and higher order polyalkylene polyamine.

109. The paved road of claim 77, wherein the surfactant package comprises homolog of hydroxylalkyl amine.

110. The paved road of claim 77, wherein the surfactant package comprises salt obtained by a reaction of (i) homolog of hydroxyalkyl amine and (ii) at least one member selected from the group consisting of hydrogen halide, carboxylic acid and phosphoric acid.

111. The paved road of claim 77, wherein the surfactant package comprises at least one member selected from the group consisting of C-36 dimeric fatty acid and C-54 trimeric fatty acid.

112. The paved road of claim 77, wherein the surfactant package comprises polymeric condensation product of C-36 dimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

113. The paved road of claim 77, wherein the surfactant package comprises salt obtained by a reaction of (i) at least one member selected from the group consisting of hydrogen halide, carboxylic acid, and phosphoric acid; and (ii) at least one member selected from the group consisting of polymeric condensation product of C-36 dimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

114. The paved road of claim 77, wherein the surfactant package comprises polymeric condensation product of C-54 trimeric fatty acids and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

115. The paved road of claim 77, wherein the surfactant package comprises salt obtained by a reaction of (i) at least one member selected from the group consisting of hydrogen halide, carboxylic acid, and phosphoric acid; and (ii) at least one member selected from the group consisting of polymeric condensation product of C-54 trimeric fatty acid and at least one member selected from the group consisting of oligomeric ethyleneamine, polyethylene polyamine, oligomeric propylamine, polypropylene polyamine, the distillation residue from polyalkylene polyamine manufacture, and higher order polyalkylene polyamine.

116. The paved road of claim 77, wherein the surfactant package comprises at least one member selected from the group consisting of hydroxystearic acid, oligomer of hydroxystearic acid, and polymeric hydroxystearic acid.

117. The paved road of claim 77, wherein the surfactant package comprises polymeric condensation product formed by a reaction of (i) at least one member selected from the group consisting of ethylene amine, propylene amine, ethylene/propylene amine, oligomeric ethyleneamine, polyethylene polyamine, oligomeric propylene amine, distillation residue from polyalkylene polyamine manufacture, and higher order polyalkylene polyamine; and (ii) at least one member selected from the group consisting of hydroxystearic acid, oligomer of hydroxystearic acid, and polymeric hydroxystearic acid.

118. The paved road of claim 77, the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of lithium hydroxide, sodium hydroxide, potassium hydroxide, and Lewis acid base.

119. The paved road of claim 77, wherein the surfactant package comprises ethoxytrimethyleneamine derivatives of C-12 to C-24 fatty amines of structure (I)

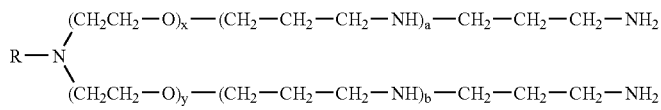

wherein

R=saturated or unsaturated aliphatic C-12 to C-24 having linear, branched, or cyclic structure;

$x+y \geq 2$; and $a, b \geq 0$.

120. The paved road of claim 77, wherein the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of ethoxytrimethyleneamine derivatives of C-12 to C-24 fatty amines of structure (I).

121. The paved road of claim 77, wherein the surfactant package comprises propoxytrimethyleneamine derivatives of C-12 to C-24 fatty amines of structure (II)

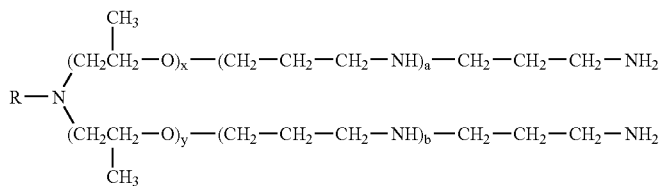

wherein
R=saturated or unsaturated aliphatic C-12 to C-24 having linear, branched, or cyclic structure;
x+y≧2; and
a, b≧0.

122. The paved road of claim 77, wherein the surfactant package comprises polymeric condensation product of (i) at least one member selected from the group consisting of hydroxystearic acid, oligomers of hydroxystearic acid, and polymeric hydroxystearic acid; and (ii) at least one member selected from the group consisting of propoxytrimethyleneamine derivative of C-12 to C-24 fatty amine of structure (II).

123. The paved road of claim 77, wherein the surfactant package comprises aliphatic diakylamine of structure (III)

wherein
R$^1$, R$^2$=saturated or unsaturated C-12 to C-24 moieties having linear, branched, or cyclic structure.

124. The paved road of claim 77, wherein the surfactant package comprises salt obtained by the reaction of (i) at least one member selected from the group consisting of hydrogen halide, carboxylic acid, and phosphoric acid; and (ii) at least one member selected from the group consisting of saturated and unsaturated aliphatic C-12 to C-24 dialkyl amine of structure (III).

125. The paved road of claim 77, wherein the surfactant package comprises quaternary amine of structure (IV)

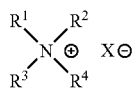

wherein
R$^1$, R$^2$=saturated or unsaturated aliphatic C-12 to C-24 moieties having linear, branched, or cyclic structure; and
R$^3$, R$^4$=methyl or higher order homolog of saturated or unsaturated aliphatic C-12 to C-24 moieties having linear, branched, or cyclic structure.

126. The paved road of claim 77, wherein the surfactant package comprises salt obtained by the reaction of (i) at least one member selected from the group consisting of hydrogen halide, carboxylic acid, and phosphoric acid; and (ii) at least one member selected from the group consisting of saturated an unsaturated aliphatic C-12 to C-24 alkyl quaternary amine of structure (IV).

127. The paved road of claim 77, wherein the surfactant package comprises quaternary amine of structure (V)

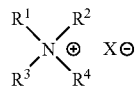

wherein:
R$^1$, R$^2$=saturated or unsaturated aliphatic C-12 to C-24 moieties having linear, branched, or cyclic structure; and
R$^3$, R$^4$=ethoxy moieties, propoxy moieties, or combinations thereof.

128. The paved road of claim 77, wherein the surfactant package comprises salt obtained by the reaction of (i) at least one member selected from the group consisting of hydrogen halide, carboxylic acid, and phosphoric acid; and (ii) at least one member selected from the group consisting of saturated an unsaturated aliphatic C-12 to C-24 alkyl quaternary amine of structure (V).

129. The paved road of claim 77, wherein the surfactant package comprises bisamide formed by a reaction of polyalkylenepolyamine and adduct obtained by modifying at least one member selected from the group consisting of saturated aliphatic C-12 to C-24 fatty acid unsaturated aliphatic C-12 to C-24 fatty acids with at least one member selected from the group consisting of acrylic acid, maleic anhydride, fumaric acid, diene and dieneophiles, and wherein the C-12 to C-24 fatty acid has linear, branched, or cyclic structure.

130. The paved road of claim 77, wherein the surfactant package comprises salt obtained by the reaction of (i) at least one member selected from the group consisting of hydrogen halide, carboxylic acid, and phosphoric acid; and (ii) at least one member selected from the group consisting of bisamide formed by a reaction of polyalkylenepolyamine and adduct obtained by modifying at least one member selected from the group consisting of saturated aliphatic C-12 to C-24 fatty acid unsaturated aliphatic C-12 to C-24 fatty acids with at least one member selected from the group consisting of acrylic acid, maleic anhydride, fumaric acid, diene and dieneophiles, and wherein the C-12 to C-24 fatty acid has linear, branched, or cyclic structure.

131. The paved road of claim 77, wherein the surfactant package comprises dialkylarylamine.

132. The paved road of claim 77, wherein the surfactant package comprises salt obtained by the reaction of at least one member selected from the group consisting of hydrogen halide, carboxylic acid, and phosphoric acid; and dialkylarylamine.

133. The paved road of claim 77, wherein the surfactant package has an interfacial tension between the bitumen and water of less than 30 dynes/cm at a temperature of 26° C. and at an aqueous concentration of less than 0.1% weight.

134. The paved road of claim 77, wherein the surfactant package has an interfacial tension between the bitumen and water of less than 20 dynes/cm at a temperature of 26° C. and at an aqueous concentration of less than 0.1% weight.

135. The paved road of claim 77, wherein the surfactant package has an interfacial tension between the bitumen and water of less than 10 dynes/cm at a temperature of 26° C. and at an aqueous concentration of less than 0.1% weight.

136. The paved road of claim 77, wherein the surfactant package has an interfacial tension between the bitumen and water of less than 5 dynes/cm at a temperature of 26° C. and at an aqueous concentration of less than 0.1% weight.

137. The paved road of claim 77, wherein the water-in-oil bitumen dispersion comprises organic solvent in an amount of less than or equal to 4% by weight by total weight of the dispersion.

138. The paved road of claim 77, wherein the water-in-oil bitumen dispersion comprises organic solvent in an amount of less than 1% by weight by total weight of the dispersion.

139. The paved road of claim 77, wherein the aggregate comprises at least one member selected from the group consisting of dense-graded aggregate, gap-graded aggregate, open-graded, stone-matrix aggregate, reclaimed asphalt paving material, reclaimed roofing shingles, and combinations thereof.

140. The paved road of claim 77, wherein the bituminous composition further comprises additive for enhancing processability or improving performance of the composition.

141. The paved road of claim 77, wherein the water-in-oil bitumen dispersion is using high-shear mixing process comprising at least one member selected from the group consisting of high-shear colloid mill dispersion, high-shear static mixer dispersion, high-shear roto-mixer dispersion, high-shear dispersion via injection of the water into a bitumen process stream through phase inversion process, and combinations thereof.

142. The paved road of claim 77, wherein the bituminous composition is applied to its surface at a temperature in a range of about 0° C. to about 120° C.

143. The paved road of claim 77, wherein the bituminous composition is applied to its surface at a temperature in a range of about 85° C. to about 100° C.

144. The paved road of claim 77, wherein the bituminous composition is applied to its surface at a temperature in a range of about 85° C. to about 95° C.

145. The paved road of claim 77, wherein during preparation of the bituminous composition, the water-in-oil bitumen dispersion has a temperature in a range of about 75° C. to about 95° C., and the aggregate and/or reclaimed asphalt pavement has a temperature in a range of about 60° C. to about 140° C.

* * * * *